US012811974B2

(12) United States Patent
Shankar et al.

(10) Patent No.: US 12,811,974 B2
(45) Date of Patent: Nov. 24, 2026

(54) HYBRID TECHNIQUES OF DYNAMIC DISCOVERY, THREAT DETECTION, ASSESSMENT, RESPONSE, AND MONITORING OF xIoT DEVICES ON A NETWORK

(71) Applicant: Phosphorus Security LLC, Hanover, MD (US)

(72) Inventors: Sonu Shankar, Nashville, TN (US); Jeremy Lindsey Gould, San Bruno, CA (US); Justin Trent Altman, Carlsbad, CA (US); Earle W. Ady, Jackson, WY (US)

(73) Assignee: PHOSPHORUS SECURITY LLC, Hanover, MD (US)

( * ) Notice: Subject to any disclaimer, the term of this patent is extended or adjusted under 35 U.S.C. 154(b) by 115 days.

(21) Appl. No.: 18/482,744

(22) Filed: Oct. 6, 2023

(65) Prior Publication Data

US 2025/0119449 A1 Apr. 10, 2025

(51) Int. Cl.
*H04L 29/00* (2006.01)
*H04L 9/40* (2022.01)

(52) U.S. Cl.
CPC ................................ *H04L 63/1433* (2013.01)

(58) Field of Classification Search
CPC ................................................... H04L 63/1433
See application file for complete search history.

(56) References Cited

U.S. PATENT DOCUMENTS 9,681,360 B1 * 6/2017 Salyers ................. H04W 12/64
9,749,922 B2 * 8/2017 Chang ................... H04W 36/22
10,154,503 B2 * 12/2018 Folke .................. H04W 72/541
11,368,369 B2 * 6/2022 Buck ...................... H04L 41/082
11,418,520 B2 * 8/2022 Mehta ................. H04L 63/1416
11,722,509 B2 * 8/2023 Martini ............... H04L 63/1416
726/23
11,757,724 B1 9/2023 Rouland et al.
(Continued)

FOREIGN PATENT DOCUMENTS

CN 106789177 B 9/2019

OTHER PUBLICATIONS

International Search Report and Written Report issued by U.S. Patent Office as International Searching Authority in International Application No. PCT/US24/47063, dated Nov. 12, 2024 (10 pages).

*Primary Examiner* — Don G Zhao
(74) *Attorney, Agent, or Firm* — Wilmer Cutler Pickering Hale and Dorr LLP

(57) ABSTRACT

In some embodiments, a hybrid approach is provided for discovering devices on a network, assessing if the devices are vulnerable to security threats and malicious attacks, remediating the devices that are vulnerable, detecting security threats and malicious attacks on the network, and responding to such threats and attacks. In some implementations, a hybrid site manager for the network passively scans the network, obtains information about a network device, and actively transmits a probe to the network device based on the obtained information. In some embodiments, the hybrid site manager actively sends a probe over the network to a network device, receives a response to the probe, and modifies how it passively scans the network based on the response to the probe.

30 Claims, 15 Drawing Sheets

(56) References Cited

U.S. PATENT DOCUMENTS

| | | | | |
|---|---|---|---|---|
| 12,082,112 | B2 * | 9/2024 | Wang | H04W 48/12 |
| 12,244,636 | B1 * | 3/2025 | Anand | H04L 63/1433 |
| 12,301,611 | B1 * | 5/2025 | Miseiko | H04L 41/046 |
| 12,401,629 | B2 * | 8/2025 | Crabtree | H04L 9/3236 |
| 2003/0218000 | A1 * | 11/2003 | Haber | A47J 36/24<br>219/439 |
| 2005/0128988 | A1 * | 6/2005 | Simpson | H04W 48/16<br>370/338 |
| 2005/0171720 | A1 * | 8/2005 | Olson | H04W 12/122<br>702/121 |
| 2005/0229255 | A1 * | 10/2005 | Gula | H04L 63/1433<br>726/23 |
| 2006/0193284 | A1 * | 8/2006 | Stieglitz | H04L 63/1408<br>370/242 |
| 2006/0200862 | A1 * | 9/2006 | Olson | H04L 63/1433<br>726/23 |
| 2008/0043637 | A1 * | 2/2008 | Rahman | H04L 45/28<br>370/254 |
| 2010/0100930 | A1 * | 4/2010 | King | H04L 63/1433<br>726/1 |
| 2010/0251363 | A1 * | 9/2010 | Todorovic | G06F 21/56<br>718/1 |
| 2011/0185431 | A1 * | 7/2011 | Deraison | G06F 21/577<br>726/25 |
| 2013/0007837 | A1 * | 1/2013 | King | H04W 12/122<br>726/1 |
| 2013/0077505 | A1 * | 3/2013 | Choudhary | H04W 48/14<br>370/252 |
| 2013/0337847 | A1 * | 12/2013 | Sridhara | H04W 64/00<br>455/456.6 |
| 2016/0231456 | A1 * | 8/2016 | McKenney | G01V 5/26 |
| 2017/0041919 | A1 * | 2/2017 | Tanaka | H04W 8/005 |
| 2017/0094521 | A1 * | 3/2017 | Salyers | H04W 48/04 |
| 2017/0094556 | A1 * | 3/2017 | HomChaudhuri | H04L 47/11 |
| 2017/0331827 | A1 * | 11/2017 | Salyers | H04L 63/10 |
| 2018/0159751 | A1 | 6/2018 | Zhang | |
| 2018/0220301 | A1 * | 8/2018 | Gallagher | H04W 4/021 |
| 2020/0191913 | A1 * | 6/2020 | Zhang | G01S 7/412 |
| 2020/0244696 | A1 | 7/2020 | Thomas | |
| 2020/0404502 | A1 * | 12/2020 | Trivellato | H04L 63/1458 |
| 2020/0412758 | A1 * | 12/2020 | Trivellato | H04L 63/1441 |
| 2021/0042423 | A1 * | 2/2021 | Inokuchi | G06F 21/566 |
| 2021/0281609 | A1 * | 9/2021 | Crabtree | H04L 63/20 |
| 2021/0400074 | A1 * | 12/2021 | Smith | H04L 63/1408 |
| 2022/0014561 | A1 * | 1/2022 | Caceres | G06F 16/951 |
| 2022/0103592 | A1 * | 3/2022 | Semel | H04L 63/1408 |
| 2022/0141247 | A1 * | 5/2022 | Shakarian | H04L 63/1433<br>726/25 |
| 2023/0113706 | A1 * | 4/2023 | Rohrkemper | G01V 3/10<br>324/207.22 |
| 2023/0421579 | A1 * | 12/2023 | Thomas | H04L 63/1416 |
| 2024/0022547 | A1 * | 1/2024 | Crabtree | H04L 63/0428 |
| 2024/0210547 | A1 * | 6/2024 | Crook | G01S 7/527 |
| 2025/0112952 | A1 * | 4/2025 | Ankaiah | H04L 63/0876 |

* cited by examiner

| **Protocol** | **Ports** |
|---|---|
| ARP | |
| ICMP | |
| BACnet | 47808 |
| SNMP | |
| TCP SYN | 502, 5094, 44818 |

FIG. 7A

| Protocol | Ports |
|---|---|
| ENIP | |
| HART-IP | |
| Modbus | |
| NetBIOS | |
| SIP | |
| SNMP | |
| TCP SYN | 21, 22, 23, 80, 443, 8443, 9999 |

FIG. 7B

| Protocol | Ports |
|---|---|
| FTP | |
| SNMP | |
| SSH | |
| TCP/TLS | 80, 443, 8443 |
| TCP SYN | 102, 1911, 2222, 4545, 4911, 5007, 8080, 8081, 9600, 65535 |
| Telnet | 23, 9999 |
| UDP | 1900, 3702, 5060, 5353, 41794, 47808, 47809, 47810 |

FIG. 7C

| Protocol | Ports |
| --- | --- |
| BACnet | 47809, 47810 |
| S7 | |
| MDNS | |
| PROFINET | |
| MELSEC | |
| FINS | |
| RDNS | |
| TCP/TLS | 80, 102, 443, 8443, 8080, 8081, 44818, 65535 |
| TCP SYN | 280, 554, 593, 789, 832, 981, 1311, 1443, 1962, 2443, 3443, 4443, 5000, 5001, 5060, 5061, 5443, 5985, 5986, 6443, 7002, 7443, 8000, 8008, 8088, 8333, 8403, 8888, 9080, 9443, 16080, 20547 |
| Totalfow | |
| UPNP | |
| WSD | |

FIG. 7D

| Protocol | Ports |
|---|---|
| HTTP | 80, 8080, 8081 (TCP); 443, 8443 (TLS) |
| S7 | |
| iLO | |
| Redfish | |
| RTSP | |
| TCP | 280, 593, 1962, 5000, 5060, 5061, 5985, 8000, 8008, 8088, 8403, 8888, 9080, 16080 |
| TLS | 832, 981, 1311, 1443, 2443, 3443, 4443, 5001, 5443, 5986, 6443, 7002, 7443, 8333, 8403, 9443 |

FIG. 7E

HYBRID TECHNIQUES OF DYNAMIC DISCOVERY, THREAT DETECTION, ASSESSMENT, RESPONSE, AND MONITORING OF xIoT DEVICES ON A NETWORK

TECHNICAL FIELD

The present disclosure relates to Internet of Things (IoT) and Operational Technology (OT) security.

BACKGROUND

Despite the continued technological advancements and proliferation of network-connected devices, the Extended Internet of Things (xIoT) security, including Operational Technology (OT) security, continues to rely on outdated, inefficient, and inadequate technologies. As the number and sophistication of devices on a network increases, so does the number of potential vulnerabilities and the difficulty in not only mitigating those vulnerabilities, but also doing so practically, quickly, and efficiently.

At the outset of modern IoT and OT security, "passive" solutions were used to listen to network traffic originating from devices connected to a network to discover the network devices and determine whether any of them are potentially malicious. Upon discovering a potentially malicious device, the passive approach would then apply rudimentary techniques to mitigate the risk, such as preventing the IP address of the device from accessing the network.

However, these passive approaches have several problems. First, since these approaches attempt to determine which devices are connected to the network simply by listening to network traffic, they are often incapable of definitively determining the specific types of devices connected to the network. For example, different types of devices transmit similar messages or messages having the same or similar protocols. As such, discriminating among these different devices by listening to the network messages that they send and receive is difficult. Moreover, per the passive approaches, a device can only potentially be discovered when it transmits a message over the network. Accordingly, if a network device sends messages over the network relatively infrequently, passive approaches may have difficulty discovering that the device is even connected to the network in the first place.

In addition, the passive approaches are incapable of fixing or remediating a vulnerable or malicious device automatically. For example, passive approaches are unable to gather specific details of a network device, such as the specific manufacturer and model of the device, the communication capabilities of the device, the firmware version of the device, etc. As such, these approaches are not able to satisfactorily assess the potential risk of vulnerable or malicious devices or how to remediate any potential risk that is assessed. Moreover, these passive approaches typically are designed to be "overprotective" of the network and often inadvertently disconnect legitimate, non-malicious devices from the network out of an abundance of caution. To compound this problem, if legitimate devices have been improperly disconnected from the network, they often remain disconnected for a substantial period of time until a human user can assess these devices and the network. Namely, often, a human user must evaluate the devices and the network, confirm that the devices do not present any security risks, manually reconnect the devices to the network, and possibly make modifications to the devices and/or the network to prevent the devices from being unintentionally disconnected again.

Further, when implementing a passive approach, the security component monitoring the traffic on the network must wait until a network device actually transmits data over the network before it can assess the traffic and determine whether the device is malicious. If the network device is malicious, it may have already damaged or infected the network by the time the security component is able to monitor and assess the device's traffic.

Following the development of such passive monitoring techniques, "active" techniques were created to provide a more complete, robust protection of networks. With an active approach, a security device is connected to the network and proactively transmits messages to devices connected to the network to gain more information about them and assess their level of risk to the network. For example, these active approaches may identify all of the potential IP addresses on a network and then use a "brute force" approach that sends messages over the network to check each and every IP address and assess whether a vulnerable or malicious device is connected to the network at a particular address. As a result, these active techniques often create a significant amount of additional network traffic while they are being performed, which in turn, may substantially degrade the performance of the network. Moreover, these brute force, active approaches can be inefficient, time consuming, and consume a significant amount of processing and networking resources. Even worse, if there are no malicious devices currently connected to the network, then all of the messages sent are a waste of network resources. Still worse, aggressively sending many messages over the network via the active approach's "brute force" technique can cause legitimate network devices to fail and may even knock them off of the network.

Accordingly, there is a need for a unified approach to IoT and OT security that intelligently interrogates a network based on passively scanning information and also improves the effectiveness and efficiency of the passive scanning of the network through intelligence gained from the active interrogation.

SUMMARY

Embodiments of the disclosure relate to techniques for IoT and OT security that provide a unified approach to security by intelligently integrating passive and active approaches together to efficiently discover devices on a network, assess if the devices are vulnerable to security threats and malicious attacks, remediate the devices that are vulnerable, detect security threats and malicious attacks on the network, and respond to and eliminate such threats and attacks.

According to some embodiments, a method of assessing a network is provided. The method comprises: performing, by a site manager executing on a computer, passive scanning on the network, wherein the network includes a first network device; obtaining passive information comprising a first network device characteristic of the first network device based on the passive scanning; and transmitting a first probe on the network, wherein the first probe is configured based on the passive information.

According to some embodiments, a method of assessing a network is provided. The method comprises: transmitting, by a site manager executing on a computer, a first probe over the network to a first network device; receiving, over the network, a first response to the first probe; determining active information about the first network device based on the first response; and performing passive scanning on the network, wherein the passive scanning is modified based on the active information.

According to some embodiments, a system for assessing a network is provided. The system comprises: one or more processors and one or more memories coupled to the one or more processors, the one or more memories comprising instructions executable by the one or more processors, and the one or more processors being operable when executing the instructions to: perform passive scanning on the network, wherein the network includes a first network device; obtain passive information comprising a first network device characteristic of the first network device based on the passive scanning; and transmit a first probe on the network, wherein the first probe is configured based on the passive information.

According to some embodiments, a system for assessing a network is provided. The system comprises: one or more processors and one or more memories coupled to the one or more processors, the one or more memories comprising instructions executable by the one or more processors, and the one or more processors being operable when executing the instructions to: transmit a first probe over the network to a first network device; receive, over the network, a first response to the first probe; and determine active information about the first network device based on the first response; perform passive scanning on the network, wherein the passive scanning is modified based on the active information.

BRIEF DESCRIPTION OF FIGURES

Various objects, features, and advantages of the disclosed subject matter can be more fully appreciated with reference to the following detailed description when considered in conjunction with the following drawings, in which like reference numerals identify like elements. While multiple embodiments are disclosed, still other embodiments of the present disclosure will become apparent to those skilled in the art upon reading the detailed description. Accordingly, the drawings and detailed description are to be regarded as illustrative and not limiting.

FIG. 7A is an example of a first tier of probes that are directed to devices that communicate via protocols according to some embodiments.

FIG. 7B is an example of a second tier of probes that are directed to devices that communicate via protocols according to some embodiments.

FIG. 7C is an example of a third tier of probes that are directed to devices that communicate via protocols according to some embodiments.

FIG. 7D is an example of a fourth tier of probes that are directed to devices that communicate via protocols according to some embodiments.

FIG. 7E is an example of a fifth tier of probes that are directed to devices that communicate via protocols according to some embodiments.

DETAILED DESCRIPTION

In the following description, numerous specific details are set forth regarding the systems and methods of the disclosed subject matter, as well as environments in which such systems and methods may operate, in order to provide a thorough understanding of the subject matter. It will be apparent to one skilled in the art, however, that the disclosed subject matter may be practiced without such specific details, and that certain features, which are well known in the art, are not described in detail for the sake of brevity and to avoid complicating the description of the illustrative embodiments. In addition, it will be understood that the examples provided below are illustrative, non-limiting embodiments and that other embodiments exist.

Figure 1A:
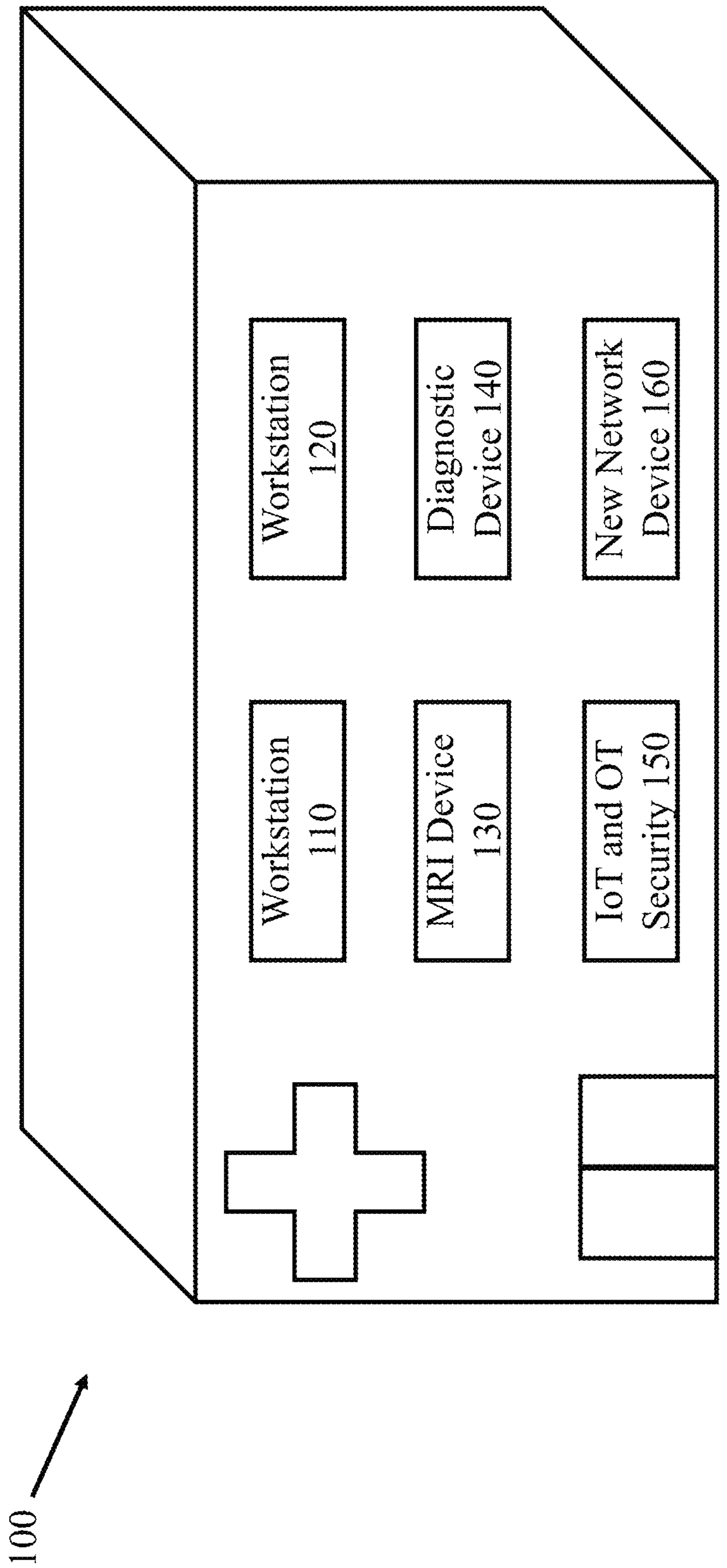
FIG. 1A is a networked hospital environment, according to some embodiments.

As noted in the Background Section above, IoT security (including OT security), in general, may be approached in two different ways: a "passive" approach or an "active" approach. To illustrate these two approaches, an exemplary network environment of a hospital is shown in FIG. 1A. The hospital 100 includes multiple different network devices that may typically be used in a hospital environment, such as: workstations 110 and 120, a magnetic resonance imaging ("MRI") device 130, and a laboratory diagnostic device 140. An IoT and OT security device 150 is also connected to the network for monitoring and evaluating the network. As further shown in the figure, a new network device 160 has recently connected to the network.

If the IoT and OT security device 150 uses the "passive" approach described above, it discovers devices connected to the network and assesses the security of the network in an "observational" manner by monitoring—or "listening"—to network traffic. Based on this traffic, the passive approach attempts to discover and identify which devices are connected to the network and which discovered devices potentially may be malicious by identifying new communication channels on the network and/or changes in the types of communications occurring on the network. In this example, assume that a new network device 160 (which is unknown to the IoT and OT security device 150) is connected to the network via one of the ports of the device 160. When implementing the passive approach, the IoT and OT security device 150 simply listens to network communication traffic on the network and must wait for the new network device 160 to transmit data over the network before it can monitor that traffic, attempt to adequately discover the device 160, and assess whether it is malicious or otherwise poses a threat.

Figure 1B:
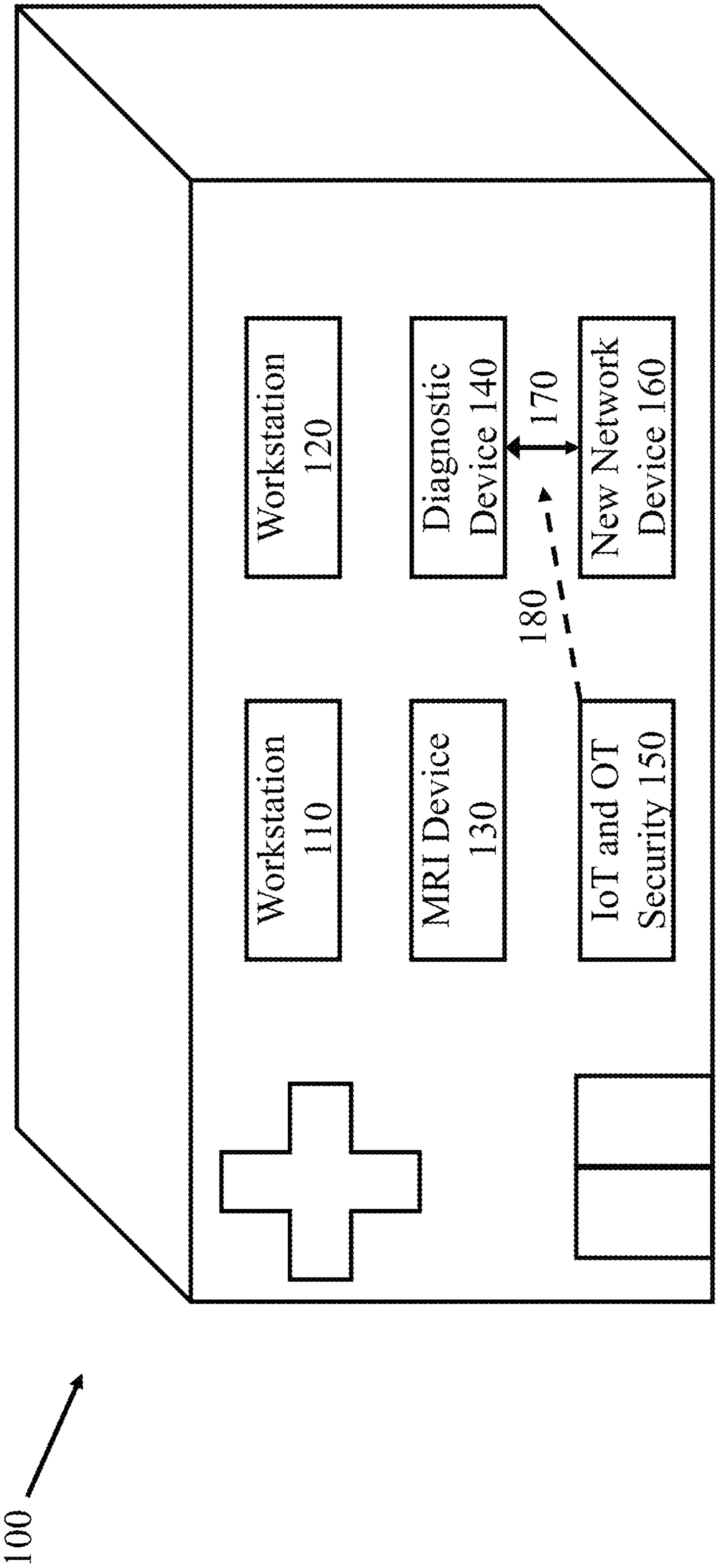
FIG. 1B is a networked hospital environment, according to some embodiments.

For example, as shown in FIG. 1B, the new network device 160 may begin communicating with the diagnostic device 140 over a communication channel 170. Only after the communication channel 170 is established between the devices 160 and 140, can the IoT and OT security device 150 monitor the messages and information exchanged between the devices 160 and 140 over a network listening channel 180. If the new network device 160 is malicious, then it may have already damaged or infected the network of the hospital 100 by the time the IoT and OT security device 150 can listen to the traffic, try to identify the device, and assess its malicious messages or traffic.

This passive approach has several drawbacks. For example, since the approach merely passively listens to existing traffic on the network, it has limited visibility into hardware devices (such as the new network device 160) that are connected to a network. This, in turn, significantly hinders the ability of the IoT and OT security device 150 to adequately discover the network devices (as noted above) and detect malicious devices, especially when numerous devices frequently connect to (and disconnect from) the network via different ports that may be differently configured. Despite these disadvantages, since passive solutions only monitor existing traffic on the network and do not generate any additional traffic on the network, they at least have the benefits of not overburdening the network, not disrupting or corrupting fragile, legitimate network devices (such as devices that are sensitive to degradation of service or availability), and not knocking legitimate devices off the network.

If the IoT and OT security device 150 uses the "active" approach described above, it may proactively send messages over the network to all possible port numbers at IP addresses of devices that may be connected to the network to try to discover the devices connected to the network and assess whether any of the devices are malicious. In this example, assume that the new network device 160 (which is unknown to the IoT and OT security device 150) is connected to the network via one of its ports. When implementing the active approach, the IoT and OT security device 150 sends individual messages to each and every device on the network to identify and assess each device and determine if any of them is a new and/or a malicious device.

Figure 1C:
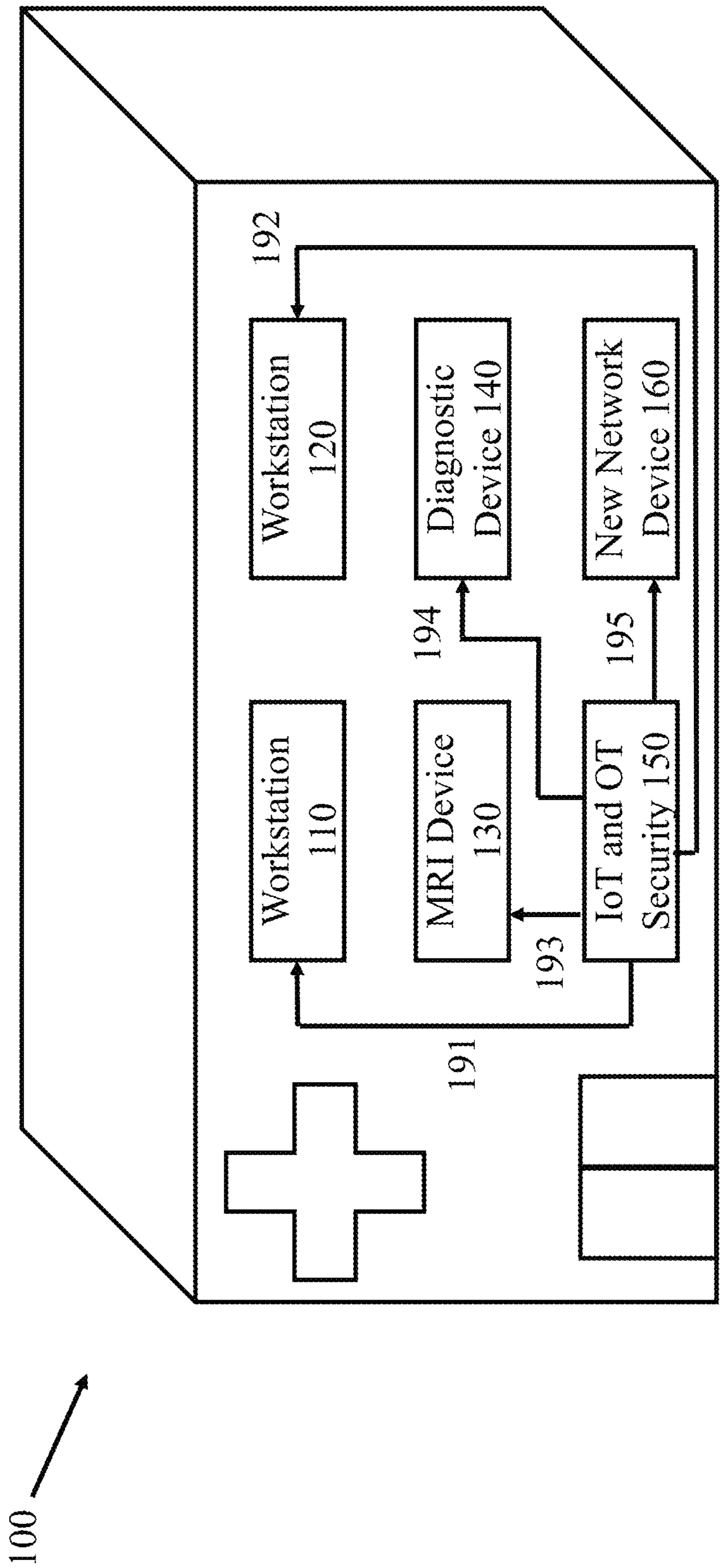
FIG. 1C is a networked hospital environment, according to some embodiments.

For example, as shown in FIG. 1C, even before the new network device 160 sends any messages or information over the network, the IoT and OT security device 150 floods the network with messages 191 to 195. As shown, these messages 191 to 195 are sent to the different devices on the network to determine the devices' identities and assess their status (e.g., whether the devices pose a threat or are otherwise malicious).

As noted above, this "brute force" approach of sending messages to every device on the network may not only be very taxing on the network, but it is highly inefficient, time consuming, and requires a significant amount of processing and networking resources. Namely, of the thousands of possible network IP addresses that may receive the "brute force" messages on the network, only one IP address may correspond to a malicious device. As such, a significant amount of network traffic, time, and resources is required to discover a malicious device and determine that it poses a threat. Even worse, if no malicious devices are connected to the network, all of the active scanning operations are a waste of network resources. Furthermore, and still worse, as explained above, inundating the network with messages per the active approach may cause legitimate network devices to fail and/or may knock them off of the network.

To compound these problems, sending a message to each device on the network becomes less practical as more devices, which have different configurations and characteristics, are connected to the network. For example, modern networks may have one million or more possible IP addresses, each IP address may have over ten thousand ports, and each port may be connected to a unique type of device having one of many possible versions of firmware. Thus, to determine whether a device is malicious per the brute force approach, a separate message needs to be sent (1) to each port of each IP address, (2) for each type of device that potentially may be connected to the network for each port, and (3) for each version of firmware, etc. for each of the types of devices that may be connected to each port. For example, for just one port of a device connected to a single IP address of the network, assume that 100,000 different types of devices may be connected to the port, and each of the 100,000 different types of devices may have 100 different versions of firmware. In this case, per the active approach, the IoT and OT security device would have to send a different message to the single port for each of the 100 different firmware versions for each of the 100,000 different types of devices that may be connected to the port. In other words, 10,000,000 messages (100,000 devices×100 firmware versions) would have to be sent to the single port at the single IP address to check for all versions of all devices that may be connected to the network via the port at the IP address. Since a network for a large commercial or industrial enterprise or a hospital may have tens of thousands of IP addresses at which devices may be connected, sending messages to all of the IP addresses of the entire network to try to discover the network devices associated with each individual IP address on the network and assess their security risk could require several weeks of time to completely check all of the ports and IP addresses for different types of devices and their different types of firmware.

Despite the disadvantages of active approaches, they at least have the benefit of being more thorough and complete than passive approaches because they proactively send messages to each port of each device on the network to discover and assess each device, rather than having to passively wait for devices to communicate over the network before detecting them and determining whether they are malicious.

Accordingly, there has been a long-felt need for a unified approach that combines the benefits of passive and active approaches without suffering from the drawbacks of either. However, such an approach, as described in the embodiments provided herein, is not simply achieved by performing a passive technique and an active technique together. In fact, combining the two approaches creates additional issues. For example, simply combining the two techniques would still result in overburdening the network with significant traffic by sending messages to each port of each network device connected at each IP address (per the active approach). Moreover, the combined technique would have to monitor (per the passive approach) even more network traffic—the existing traffic generated by the network devices and the additional traffic generated when the devices respond to the messages per the active approach.

To improve upon active IoT and OT security approaches, certain embodiments use an intelligent technique that uses a tiered set of "interrogating" messages—called "probes"—that are transmitted over the network to discover devices connected to the network and assess whether they pose a threat. These probes are tailored, in terms of their protocol and content, to a specific type or types of devices based on an understanding of the typical types of devices connected to the particular network being analyzed.

For example, if the network is a hospital network, such as the network of the hospital 100 shown in FIGS. 1A-1C, the probes transmitted over the network may be tailored to communicate with the types of devices likely to be present on a hospital network (e.g., workstations 110 and 120, an MRI device 130, a diagnostic device 140, etc.). Furthermore, these probes may not include probes that are designed to communicate with types of devices that typically would not be connected to hospital networks, such as computer aided design ("CAD") devices connected to a machine shop network or manufacturing robots connected to a network in an automobile factory. On the other hand, if the network is a university or college network, the probes may be tailored to communicate with the types of network devices that are consistent with those used in a university. As a result, this intelligent active technique avoids the inefficiencies of conventional active techniques that blindly interrogate a network irrespective of the type of network it is analyzing and the typical types of devices that may be connected to the network. Namely, continuing with the example above, rather than sending probes to each network port for different versions of 100,000 different types of devices, the intelligent active technique may create a set of tailored probes for 500 devices and selected versions of those devices that may be connected to the particular network being analyzed. In this case, the number of probes or interrogating messages that would need to be transmitted over the network and the number of responses to those messages that would need to be analyzed are significantly reduced.

In yet a further implementation, the probes may be tailored based on, for example, the communication protocols used by the types of devices that communicate (or potentially may communicate) over the network and the manufacturers, models, firmware versions, configurations, credentials, etc. of these types of devices. In one implementation, the probes are configurable and may include interrogation messages (or requests) to specific port numbers of network devices, requests to particular types or versions of devices, and/or requests that are compatible with specific attributes or applications used on the network. In another implementation, instead of sending a request to just one address, a probe may be sent to a range of selected IP addresses on the network, each of which corresponds a location on the network where a device may be known to be connected, expected to be connected, and/or deemed likely to be connected.

Examples of intelligent active techniques that utilize tiers of probes are described in U.S. patent application Ser. No. 17/987,585 to Rouland et al., which was filed on Nov. 15 2022, issued as U.S. Pat. No. 11,757,724, and is incorporated by reference herein in its entirety. Furthermore, these intelligent active techniques can also be used to perform part of a "hybrid" security approach described below in conjunction with some embodiments.

In one embodiment of the intelligent active approach, the tailored probes sent to the IP addresses on a network include requests for device information. If a device is located at one of the addresses and the probe is configured to communicate with the device (e.g., has a message format/protocol that is compatible with the device), the device may process the request and generate a corresponding response containing various information about itself. Upon receiving the response, the IoT and OT security device (such as the device 150 shown in FIGS. 1A-1C) can process the response and assess the device information to identify the device. Furthermore, if the device does not respond to a probe, the IoT and OT security device 150 can take such fact into account when evaluating the security risk of the device as well.

In one implementation, tiers of probes may be created based on certain communication protocols that certain types or "families" of devices may use to communicate over the network. For example, as shown in FIG. 7A, a first tier of probes may be directed to devices that communicate via the ARP, ICMP, BACnet, SNMP, and TCP SYN protocols (with some probes communicating via certain ports of network devices). As shown in FIG. 7B, a second tier of probes may be directed to devices that communicate via the ENIP, HART-IP, Modbus, NetBIOS, SIP, SNMP, and TCP SYN protocols (with some probes communicating via certain ports of network devices). As shown in FIG. 7C, a third tier of probes may be directed to devices that communicate via the FTP, SNMP, SSH, TCP/TLS, TCP SYN, Telnet, and UDP protocols (with some probes communicating via certain ports of network devices). As shown in FIG. 7D, a fourth tier of probes may be directed to devices that communicate via the BACnet, S7, MDNS, PROFINET, MELSEC, FINS, RDNS, TCP/TLS, TCP SYN, Totalfow, UPNP, and WSD protocols (with some probes communicating via certain ports of network devices). As shown in FIG. 7E, a fifth tier of probes may be directed to devices that communicate via the HTTP, S7, iLO, Redfish, RTSP, TCP, and TLS protocols (with some probes communicating via certain ports of network devices). Of course, different or additional tiers of probes directed to additional protocols and ports may be used. Examples of such protocols and corresponding ports, where "int" indicates port number, may include:

DNSPort int=53
RDNSPort int=53
NTPPort int=123
SNMPPort int=161
NetBIOSPort int=137
RTSPPort int=554
SSDPPort int=1900
WSDPort int=3702
SLMPUDPPort2 int=5005
MelsecQUDPPort int=5006
SLMPUDPPort int=5006
HARTIPPort int=5094
MDNSPort int=5353
FINSPort int=9600
IntellivuePort int=24105
ProfinetPort int=34964
CrestronPort int=41794
BACnetPort int=47808
FTPPort int=21
SSHPort int=22
TelnetPort int=23
SMTPPort int=25
FingerPort int=79
HTTPPort int=80
POP3Port int=110
RPCBindPort int=111
S7Port int=102
NNTPPort int=119
IMAPPort int=143
HTTPSPort int=443
ModbusPort int=502
LPDPort int=515
SSMTPPort1 int=587
IPPPort int=631
Crimson3Port int=789
SIMAPPort int=993
SPOP3Port int=995
H323Port int=1720

MQTTPort int=1883
FoxPort int=1911
PCWorxPort int=1962
BAEWRPort int=2222
SSMTPPort2 int=2525
MySQLPort int=3306
RDPNTLMPort int=3389
OpenProtocolPort int=4545
OPCUAPort int=4840
FoxTLSPort int=4911
MelsecQTCPPort int=5007
SLMPTCPPort int=5007
SIPPort int=5060
SSIPPort int=5061
SIPPort2 int=5062
AMQPPort int=5672
X11Port int=6000
RedisPort int=6379
WUDOPort int=7680
SMQTTPort int=8883
JetDirectPort int=9100
TotalflowPort int=9999
ProConOSPort int=20547
EnIPPort int=44818
CognexPort int=50000
LockdowndPort int=62078
TotalflowFirmwarePort int=65535

When a device responds to a probe within a particular tier, one or more additional targeted probes or interrogation messages may be sent to the device to discover additional attributes about the device. For example, additional targeted probes may be sent to discover the type of the device (e.g., printer, camera, etc.), the manufacturer of the device, the model or series of the device, the serial number of the device, the model number of the device, the firmware version of the device, the open ports of the device, other configurations of the device, etc.

In addition, the protocols for each tier of probes and the characteristics of the additional targeted probes may be configured based on the types of networks currently being monitored. For example, the communication protocols and the types of devices used in a hospital network may be different than the protocols and types of devices used in a machine shop network or a university network. Thus, the tiers of probes and the additional targeted probes for each of these types of networks may be configured differently.

As an example, in the hospital network shown in FIGS. 1A-1C, the IoT and OT security device 150 may send a tier of probes over the network that are directed to devices that communicate in accordance with certain protocols. Afterwards, in response to one or more of these probes, the security device 150 may receive responses from the workstations 110 and 120 indicating that they communicate in accordance with a particular protocol. As a result, the device 150 can send one or more additional probes—which target devices that communicate in accordance with the particular protocol—to each of the workstations 110 and 120 to learn more information about the workstations 110 and 120. These additional probes may elicit responses from the workstations 110 and 120 that identify the type of device (i.e., a workstation), the manufacturer of the device, the model or series of the device, the serial number of the device, the model number of the device, the firmware version of the device, the open ports of the device, etc. In one implementation, a first round of targeted probes may be sent to the workstations 110 and 120 to determine their device type, and once their device type is known, a second round of probes may be sent to determine their manufacturer, model, and series. Once their manufacturer, model, and series are known, a third round of probes may be sent to determine their serial number, the model number, and firmware version. Alternatively, in another implementation, after the security device 150 receives responses from the workstations 110 and 120 to the tier of probes indicating that they communicate in accordance with the particular protocol, one round of probes may be sufficient to elicit a response with all of the desired information about the workstations 110 and 120. In a similar manner, additional tiers of probes and one or more rounds of targeted probes may be sent to discover information about magnetic resonance imaging ("MRI") devices (including the device 130) connected to the network and the laboratory diagnostic devices (including the device 140) connected to the network.

Through this iterative process of sending increasingly more focused probes to network devices, the IoT and OT security device 150 is able to quickly identify the specific types of devices connected to the network and assess and monitor these types of devices for specific types of threats from, or vulnerabilities of, these devices. If any threats or vulnerabilities are detected, the security device 150 can perform particular types of remediations to address the threats from, or vulnerabilities of, these specific devices.

For example, in assessing a device's vulnerabilities, upon receiving information about a network device, the IoT and OT security device 150 can determine if the device's firmware version is outdated, if the firmware has common vulnerabilities and exposures ("CVEs") or known vulnerabilities, if the device has its default password enabled, if the device has newer firmware available, if the device has been "end of life-ed" of "EOL-ed" by its manufacturer, if the device has an otherwise risky or vulnerable configuration, etc.

After the IoT and OT security device 150 assesses the potential vulnerabilities of a device, it can remediate or eliminate the vulnerabilities. For example, the security device 150 may update the device's firmware, change the device's password from the default password, reconfigure the device's risky configuration, etc.

Another embodiment of using tiers of probes will be described in conjunction with the network of the hospital 100 shown in FIGS. 1A-1C. In this example, assume that the hospital's patients and visitors may connect their laptop computers, mobile phones, and other mobile devices to the network via the hospital's WiFi network (which may or may not be password protected). In this embodiment, the new network device 160 shown in FIGS. 1A-1C collectively represents these mobile devices.

The IoT and OT security device 150 may initially send a first tier of probes for the many types of mobile devices that patients and guests may connect to the hospital network to discover such mobile devices connected to the network and assess whether they pose a security risk. It may be desirable to discover these types of devices and assess whether they are malicious early in the process for a number of reasons. For example, these mobile devices are "unknown" devices being operated by people who are not affiliated with the hospital, and thus, they may pose a greater risk of being a malicious device that is used to infiltrate the network of the hospital 100. Alternatively or additionally, the hospital may wish to maintain the privacy of the patients and guests. By initially sending the first tier of probes to these devices, the IoT and OT security device 160 can quickly determine that most (if not all) of the devices are not malicious. As such, the device 160 will not have to send additional probes to these non-malicious devices. This will minimize the amount of additional information that the devices send to the IoT and OT security device 150 in response to probes, thereby maintaining the patients' and guests' privacy. Once the security risk of patients' and guests' mobile devices has been evaluated, the IoT and OT security device 150 may send a second tier of probes to identify and assess other types of devices typically connected to the network, such as Internet-of-Things (IoT) devices. An IoT device may be a device that can transfer data over a network without any human-to-human or human-to-computer interaction. After sending the second tier of probes and processing the responses, the IoT and OT security device 150 may send a third tier of probes to identify and assess specific types of devices that are commonly connected to hospital networks, such as the MRI device 130 and the diagnostic device 140 shown in FIGS. 1A-1C. By transmitting probes that are tailored in this way, the number and types of network messages are significantly reduced, particularly over time, where continued network monitoring can operate on a focused subset of devices determined through the tiered approach. For instance, after the network devices are discovered and initially assessed, the IoT and OT security device 150 may focus its efforts to monitor those devices, which currently are not posing a threat to the network but which are the most likely devices to pose a threat.

In one embodiment, probes can be grouped into tiers according to "discovery agendas." At a high level, a "discovery agenda" is analogous to a "to do list" that the IoT and OT security device 150 uses to discover devices on a network and/or assess whether they are malicious. In one implementation, a discovery agenda identifies different tiers of probes configured for a particular type of network (such as the hospital network in FIGS. 1A-1C) and indicates the order in which the IoT and OT security device 150 should send the tiers of probes over the network.

For example, a discovery agenda may be configured to initially send a first tier of probes directed to devices that communicate via a first set of communication protocols, and based on the responses from network devices to the first set of probes, the discovery agenda may be configured to send certain follow-up probes to such devices. Once all of the responses to the follow-up probes have been assessed, the discovery agenda may be configured to send a second tier of probes to devices that communicate via a second set of communication protocols and then send follow-up probes to devices that respond to the second tier of probes.

In another implementation, a discovery agenda may be configured to initially send a tier of probes to mobile devices (like the patients' and guests' mobile devices), then send a tier of probes to IoT devices, then send a tier of probes to hospital devices (such as the MRI device 130 and diagnostic device 140), and then send a tier of probes to workstations (such as the workstations 110 and 120). On the other hand, the discovery agenda can be modified (or a new discovery agenda can be used) to cause the IoT and OT security device 150 to send the tiers of probes in a different order (e.g., initially to workstations, then to IoT devices, then to patients' and guests' mobile devices, and then to MRI devices, diagnostic devices, etc.). Furthermore, the discovery agenda can be configured such that probes are not sent to certain types of devices on the network or are only sent to certain types of devices on the network. For example, a discovery agenda may indicate that the IoT and OT security device 150 should only send probes to those devices most likely to be malicious or pose a threat (such as the patients' and guests' mobile devices and workstations 110 and 120) and not to those devices that are not likely to be malicious or pose a threat (such as IoT devices and hospital devices, like the MRI device 130 and diagnostic device 140).

In embodiments directed to "hybrid" systems, which use both an intelligent "active" approach and a "passive" approach and which are described in more detail below, discovery agendas may also be modified using information obtained via the passive approach to reprioritize or refocus the probes sent per the active approach. For example, in the hospital network shown in FIGS. 1A-1C, if the IoT and OT security device 150 observes network traffic (per the passive approach) that indicates that a new network device 160 potentially may be malicious, then the existing discovery agenda may be automatically modified based on this information to change its focus from sending probes (per the active approach) to the workstations 110 and 120, as currently scheduled, to instead identifying additional details about the new network device 160 and mitigating the risks that that it may pose to the network. As such, the discovery agendas may be "self-calibrating" so that the probes that are sent to devices on the network and other actions taken by the security device 150 automatically change as network conditions change and as potential new threats are encountered. That way, the IoT and OT security device 150 can adapt and focus its analysis and assessment of the network based on changing condition to quickly and efficiently detect, assess, and remediate security threats and vulnerabilities.

In other implementations of discovery agendas, probes may be organized into various tiers by prioritizing the probes based on various characteristics. In one example, a discovery agenda may specify that tiers of probes that use a less common protocol for communicating with network devices should be transmitted over the network after tiers of probes that use a more common communication protocol. In other examples, a discovery agenda may specify transmitting probes that are directed to less common port numbers of network devices after transmitting probes that are directed to more common port numbers. In other embodiments, a discovery agenda may cause (1) probes, which are more resource-intensive or generate more traffic with targeted network devices, to be sent after probes, which are less resource-intensive or generate less traffic; (2) probes which include requests with short timeout thresholds (e.g., one second) to be transmitted before probes which include requests with longer timeout thresholds; and/or (3) probes targeting specific types of devices (e.g., more fragile devices) be transmitted after probes targeting other types of devices (e.g., less fragile devices). By creating such discovery agendas, the process may discover network devices and assess whether they pose threats quickly and early in the process while minimizing the burden on the network by sending fewer messages over the network to achieve those same ends.

Figure 1D:
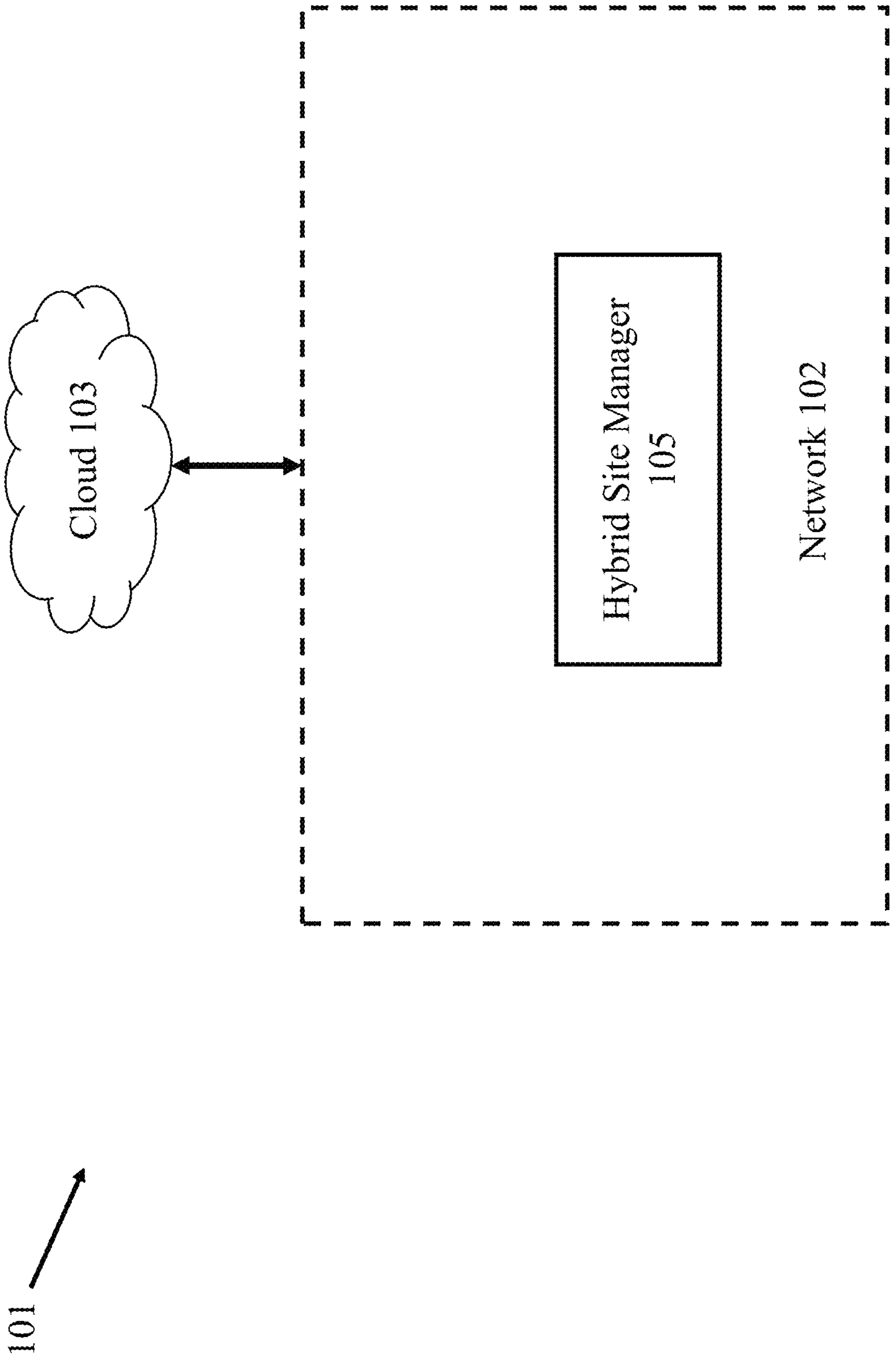
FIG. 1D is a networked environment, according to some embodiments.

FIG. 1D shows an illustrative example of a network environment 101 that comprises a network 102, which includes various network devices (not shown) and communicates with a cloud computing environment 103. The network 102 may include (1) embedded devices, such as a routers or other special-purpose appliances, (2) non-embedded devices, such as workstations, or (3) both embedded and non-embedded devices. Also, in some implementations, the network 102 may comprise a plurality of autonomous networks that are connected together.

The network 102 also includes a hybrid site manager 105. As explained in more detail below, the hybrid site manager 105 performs a "hybrid" approach for IoT and OT security that utilizes aspects of the intelligent "active" and "passive"

approaches described above in a unique way. Furthermore, in some implementations, the hybrid site manager 105 may correspond to the IoT and OT security device 150 (shown in FIGS. 1A-1C) when the device 150 configured to implement a "hybrid" approach.

The hybrid site manager 105 may comprise software that is deployed at a remote site and configured to be in communication with another system or platform that is on-site with or local to the network 102. In one example, the software platform is a graphical user interface (GUI) that includes user-selectable elements, via which a user may interact with and/or configure the hybrid site manager 105. In one implementation, a user may use the GUI to create or modify discovery agendas, etc. The software of the hybrid site manager 105 is not limited to any particular type of software or programming language, and in one example, the software may be lightweight Linux binary software. In yet another implementation, the hybrid site manager 105 is deployed on an internal protected network and communicates with devices (e.g., servers) within the protected network that, in turn, communicate with devices in one or more other segregated, autonomous networks within the network 102.

As described above, different network environments (e.g., hospital, manufacturing facility, and other environments) include different types of devices, different versions of devices, and different numbers of devices. Accordingly, each network presents its own unique challenges for assessing the network's security and vulnerability, and thus, applying the same active or passive IoT and OT security approach to all of the different network environments would be naïve and inefficient.

In contrast, embodiments of the disclosure utilize an intelligent approach that takes into consideration how network environments differ from one another to discover network devices, assess and monitor them, detect whether any of them are malicious or pose a threat, assess any threats, and address and remediate the threats. For example, and as noted above, some embodiments may group different types of devices and different versions of devices into different genus and species (along with tiers of probes for the various genus and species) based on an understanding of which types of networks devices or versions are used in which types of network environments. For instance, an industrial network environment may include networked devices such as uninterruptible power supplies, programmable logic controllers, and industrial machinery like a laser cutting tool. In contrast, a hospital network environment may include networked devices like drug-delivery pumps, heart rate monitors, and full body imaging devices (e.g., (MRI) devices). To apply the same passive monitoring approach to these different network environments would be inefficient because there is likely no need to passively listen for communications from an MRI device in an industrial manufacturing environment or passively listen for communications from an industrial laser cutting tool in a hospital environment. Similarly, using an active approach that sends messages over an industrial network environment for devices that communicate via network communication protocols only used by hospitals would likely be just as fruitless, and sending messages over a hospital network environment for devices that communicate via network communication protocols only used by industrial laser cutters would similarly be a waste of time and resources.

A particular challenge in the modern era of IoT and OT security is the prevalence of embedded devices in various networked environments. As noted above, embedded devices are specialized devices that are designed to perform a specific task or set of tasks, often without any, or little, user intervention. Thus, embedded devices differ from non-embedded or general-purpose computing devices, such as a desktop computer or workstation. Namely, non-embedded devices use standard operating systems that create an environment where a user and a computer may interact with one another to perform a large variety of tasks. In an industrial environment, for example, a user workstation may execute a standard operating system to run a web browser, conduct simulations, and receive user input through graphical user interfaces. Since embedded devices are designed and dedicated to perform specific, discrete tasks, they often are incapable of responding to messages generated via an active approach for monitoring the network and may generate very little or unusable network traffic that can be monitored by a passive approach. As such, identifying these embedded devices on a network and assessing their security risk to the network present challenges.

Figure 2:
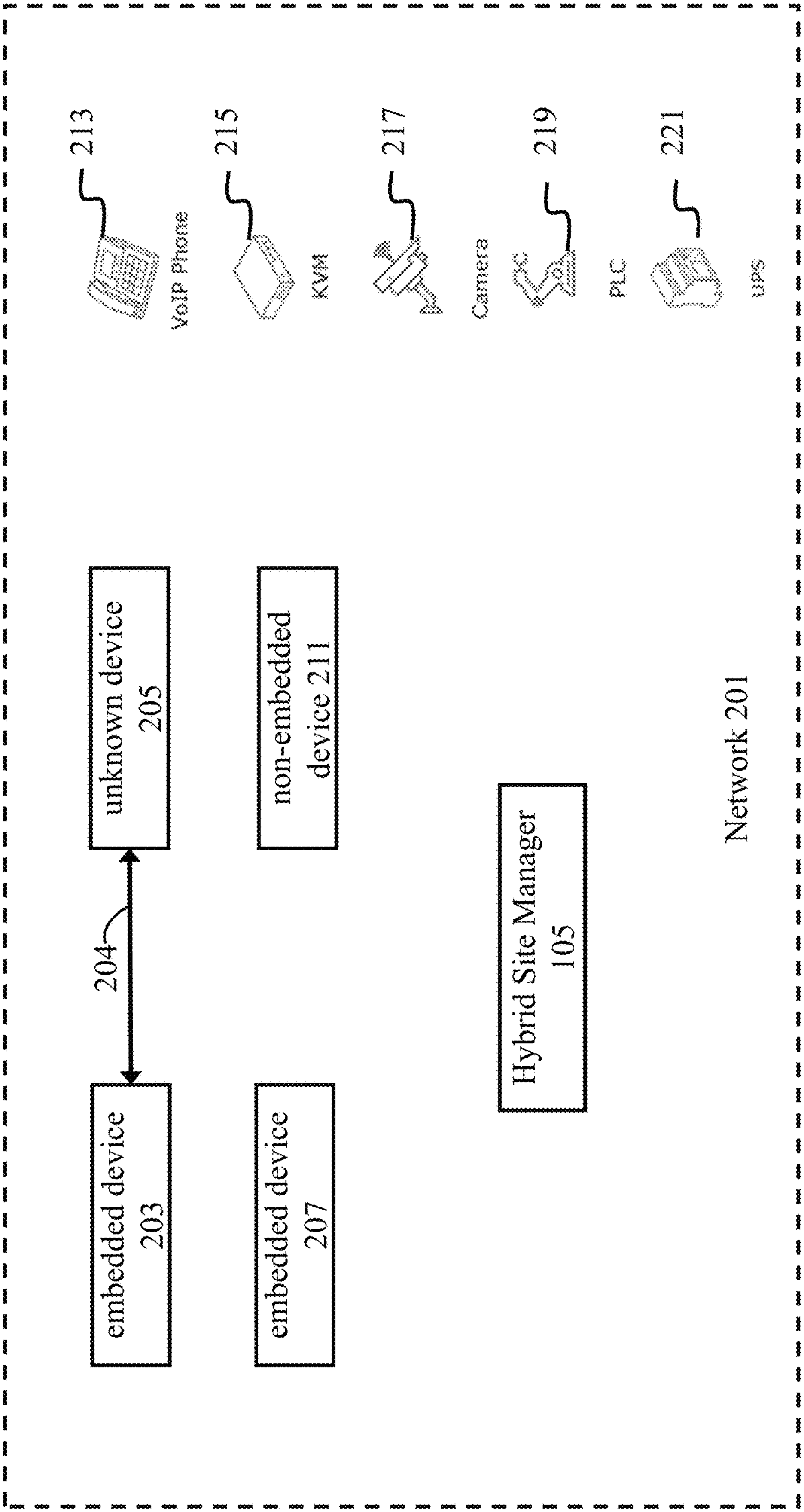
FIG. 2 is a network including a hybrid site manager, according to some embodiments.

FIG. 2 illustrates an exemplary network 201, which includes a first embedded device 203, an unknown (and potentially malicious) device 205, a second embedded device 207, a non-embedded device 211, a Voice over Internet Protocol (VOIP) phone 213, a Keyboard-Video-Mouse (KVM) 215, a camera 217, a Programmable Logic Controller (PLC) 219, and an uninterruptible power supply (UPS) 221. A hybrid site manager 105 is connected to the network 201 and configured to communicate with each of the aforementioned devices.

In some embodiments of the hybrid approach, the hybrid site manager 105 may use a passive approach to evaluate traffic on the network to learn more about what types of devices are connected to the network. Then, the manager 105 can use this information to tailor how it performs its active interrogation approach. For example, the manager 105 may send targeted probes that are configured to interrogate specific types of devices identified from the passive approach and learn more about their identities and assess whether they are malicious. Likewise, the hybrid site manager 105 may use an active approach to gather information about the devices on the network and may use this information to tailor how it performs a passive approach. For example, if the manager 105 learns that specific types of devices are connected the network based on the responses it receives from probes during the active approach, the manager 105 can configure its passive approach to listen for messages having certain communication protocols or characteristics that the identified specific types of devices typically transmit over the network. Thus, the passive approach can be further tailored to listen for and evaluate these messages to learn more about the identity of the devices and whether the messages sent by these devices are threatening or malicious.

By iteratively adjusting the passive approach based on information learned from the active approach and vice versa, the hybrid site manager 105 can use the hybrid approach to detect the presence, identity, and security risk of the network devices more efficiently and more effectively than conventional passive or active approaches. In other words, the hybrid site manager 105 can repeatedly and continuously (1) use the information learned through the passive approach to refine and improve its active approach processes and (2) use the information learned through the active approach to refine and improve its passive approach processes.

An example of how embodiments of the hybrid approach can discover and assess a potentially malicious device connected to a network will be described with reference to FIG. 2. As shown, the unknown device 205 has recently connected to the network 201, such that it can send traffic over the network 201.

Without knowing anything about the unknown device 205, including the fact that it is present at all, if a IoT and OT security device is using a conventional passive approach, then the IoT and OT security device would listen to all network traffic on the network 201 and may not even detect the presence of the unknown device 205 if the device 205 does not transmit any data over the network. Moreover, after the unknown device 205 transmits traffic over the network, the IoT and OT security device must wait to receive a sufficient amount of traffic to try to identify the device to some degree and attempt to assess whether the device 205 is malicious. Further, as explained above, if the IoT and OT security device is configured to be "overly protective" of the network 201, the IoT and OT security device may inadvertently block the unknown device 205 from the network 201, even if it is not malicious. In this case, a substantial amount of effort and/or human intervention may be required to reconnect the device 205.

On the other hand, if a IoT and OT security device is using a conventional active approach, it may take days or even weeks for the IoT and OT security device to discover the unknown device 205 by interrogating the network 201 with probes. This is especially true if the unknown device 205 is connected to the network 201 via an uncommon or infrequently used port number.

Instead of using the conventional passive or active approach, the hybrid site manager 105 in FIG. 2 uses a hybrid approach. In one implementation of this approach, the manager 105 passively listens to traffic on the network 201. When the unknown device 205 initially sends traffic over the network 201 (e.g., to the embedded device 203 via a communication channel 204), the hybrid site manager 105 evaluates the traffic and recognizes that it is coming from a device that it is unaware of. Based on this analysis, instead of waiting for the unknown device 205 to send more traffic over the network or prematurely blocking the device 205 from the network 201, the hybrid site manager 105 may send one or more probes tailored to the device 205 per the intelligent active approach. By interrogating the unknown device 205 with tailored probes, the manager 105 is able to more quickly discover additional information about device 205 and its communications over the network 201. For example, the manager 105 may discover what type of device the unknown device 205 is, its firmware version number, its particular communication protocol, the types of files it transmits, its port number, etc. Moreover, in some scenarios, the hybrid site manager 105 iteratively and simultaneously uses the intelligent active and passive approaches to learn incrementally more and more information about the unknown device 205 in a relatively short period of time. For example, using the active approach, the manager 105 may initially learn the type of the device 205. Based on this information, the manager 105 may tailor its passive approach to listen for messages having a protocol, format, or other characteristics of messages typically sent and received by the same types of devices as the unknown device 205. After learning more about the specific kinds of messages that the device 205 sends and receives, the manager 105 can further refine and tailor its probes to learn even more information about the device 205. Through this focused, iterative process, the hybrid site manager 105 can quickly obtain a substantial amount of information about the unknown device 205 and the types of messages that it is sending. As a result, the manager 105 can quickly and efficiently determine the identity of the 205 device and whether it is malicious, is sending threatening messages over the network 201, or otherwise poses a security threat to the network 201 or is vulnerable to attack. For instance, the hybrid site manager 105 may learn that the unknown device 205 is using outdated firmware and is still using its default password for accessing the device 205. Based on this realization, the manager 105 may conclude that the device 205 is vulnerable or poses a security threat. After learning about the vulnerabilities of this new device 205, the hybrid site manager 105 may modify an existing discovery agenda or create a new discovery agenda that includes one or more probes (or tiers of probes) targeting this type of device to remediate the vulnerability. For example, the hybrid site manager 105 may send a probe to update the firmware of the device 205 and change its default password to a more secure password.

As noted above, embodiments of the hybrid approach are able to iteratively use both passive and active approaches to quickly identify and target potentially malicious devices for further evaluation to quickly and efficiently determine whether or not they pose a threat. Thus, the hybrid approaches are more scalable and can be used in even very large networks to identify malicious devices. On the other hand, as explained above, the amount of time and resources required to identify IoT and OT security threats using either the conventional passive or active approach increases as the size of the network increases. Namely, with the passive approach, as the size and number of devices on the network increases, the IoT and OT security device must listen to and evaluate an increasing amount of network traffic from an increasing number of network devices. With the active approach, as the size and number of devices on the network increases, the IoT and OT security device must send an increasing number of messages to, and receive and evaluate an increasing number of responses from, an increasing number of network devices.

Furthermore, the hybrid approaches have other applications besides identifying network devices and determining whether they pose security threats to a network. For example, these approaches can determine whether legitimate, non-malicious devices on a network have failed and need to be repaired or replaced. For instance, assume that a manufacturing company has a large network that includes several printers for printing tags that need to be affixed to manufactured products before they get loaded on trucks for shipping. If one of those printers stops working, then the products are not timely labeled and shipped, which costs the manufacturer valuable time and money. In this case, the network can include a hybrid site manager to quickly identify the failed printer. Namely, the manager would use the intelligent active and passive approaches similarly to the way they are used in the IoT and OT security context to quickly identify the failed printer. For instance, the hybrid site manager may use the passive approach to listen for network traffic typically sent by the failed printer. If the manager does not observe any traffic within a certain period of time, it may send a tailored probe to the failed printer to try to elicit a response. If it does not receive a response to the probe, the manager may determine that the printer is not working properly.

As noted above, when using a conventional passive or active approach, it may take days or even weeks to evaluate an entire network to discover all of the network devices and determine whether there are any security threats. Thus, in order to periodically check for threats on a relatively short periodic basis, IoT and OT security devices using these conventional approaches often must prioritize their searches for devices that are most likely to be malicious devices or for threats to the most valuable or critical aspects of the network. As such, lower priority devices and aspects of the network are often left unchecked and vulnerable, which in turn, leaves them suspectable to attack and exploitation. On the other hand, with the hybrid approaches described herein, a full inventory and security assessment of the entire network can be completed relatively quickly and efficiently. Thus, network owners and/or operators do not have to triage and prioritize one device, group of devices, and/or aspects of the network over other devices, group of devices, and/or aspects of the network.

The hybrid approaches of some embodiments have additional benefits over conventional passive and active approaches. For example, (1) using information gleaned from passive approaches to refine and focus the network probes of active approaches, (2) using information obtained from the responses to the probes per active approaches to refine what traffic the passive approaches monitor, and/or (3) combining the use of the passive and active approaches together reduces the number of "false positives," such as inadvertently determining that a non-malicious device is malicious. As one example, and as explained above, when a conventional approach determines that a particular device on the network poses a security risk and sends information about the security risk, a human operator often needs to intervene and address the issue. In many circumstances, the human operator needs to review the information generated by the IoT and OT security device about the risk to the network. However, since the conventional approaches do not generate the security risk information based on a targeted, refined approach (like hybrid approach embodiments), the generated information typically include a large percentage of irrelevant information and a small amount of relevant information. Accordingly, the human operator typically needs to spend a significant amount of time sifting through the information to determine what portions of the information are relevant and then figuring out how to address the problem. Moreover, as noted above, some of the conventional approaches are "overly cautious" and detect a security threat to the network when, in actuality, there is none (e.g., when a non-malicious device is considered malicious). In this case, the issue noted above is compounded because none of the security risk information reviewed by the human operator relates to an actual threat. Thus, the human operator may spend a substantial amount of time reviewing the information trying to decipher a threat in the information when there is none. On the other hand, since the hybrid site manager uses a targeted hybrid approach to detect and assess network threats, the security risk information generated by the manager is likewise focused on the actual, concrete threat that was detected. Thus, to the extent that this information needs to be reviewed by a human operator, it includes more targeted and useful information, thereby reducing the amount of time that the operator needs to review the information to assess the threat.

Figure 3A:
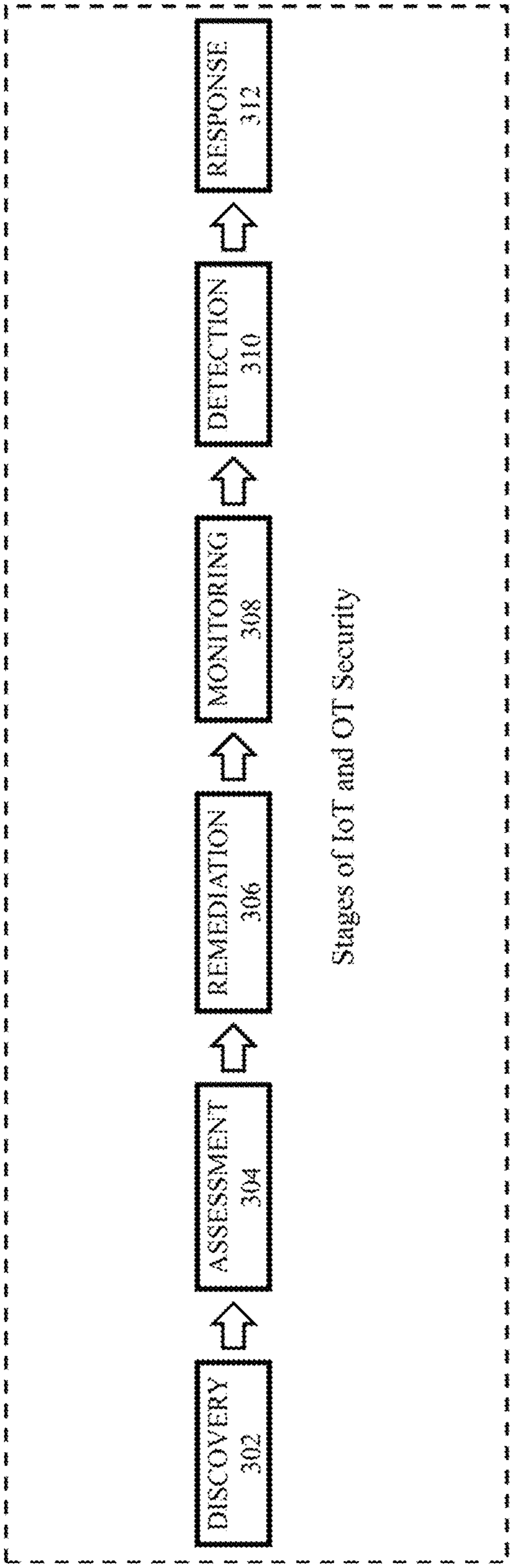
FIG. 3A is a categorization of IoT (Internet of Things) and OT (Operational Technology) security into stages where hybrid techniques are utilized, according to some embodiments.

IoT and OT security is an ongoing, flexible process that adjusts how it operates on a particular network (1) as the network changes (e.g., more and different type of devices are added to the network or new priorities, like a malicious event, arise on the network) and (2) as more information about the devices on the network is discovered. The ongoing process of IoT and OT security can be characterized by certain states of operation, sometimes called "stages," which may occur in different orders or at different times depending on how the makeup and status of the network changes or evolves. A non-limiting example of the "stages" of the IoT and OT security process is illustrated in FIG. 3A and includes a discovery stage 302, an assessment stage 304, a remediation stage 306, a monitoring stage 308, a detection stage 310, and a response stage 312.

For example, when a network is first established or when new devices are added to an existing network, the IoT and OT security device 150 (e.g., the hybrid site manager 150) may perform the "discovery" stage 302 to locate and identify the types of devices connected to the network. For example, the security device 150 may listen for communications on the network (via the passive approach). When a new device at a new IP address sends a message over the network, the security device 150 may send targeted probes to learn more details about the identity and configuration of the new device. Once the new device's identity and configuration are known, the IoT and OT security device 150 may perform the "assessment" stage 304 to determine whether the new device has any vulnerabilities or poses a security threat to the network. For example, the security device 150 may send one or more targeted probes to the new device to determine the device's firmware version and whether the device is using a default password to allow access to the device. Based on the new device's responses to the probes, the security device 150 may conclude that the device's firmware version is outdated, that the device is still configured with default passwords, and that the device has other vulnerabilities. As a result, the IoT and OT security device 150 may perform the "remediation" stage 306 to update the new device's firmware, change its password, and reconfigure the device to eliminate the other vulnerabilities.

Once the new device (and other devices) that are connected to the network are discovered, assessed, and have any vulnerabilities and threats remediated, the network is considered established or "stable." The IoT and OT security device 150 may then perform the "monitoring" stage 308 to keep an eye on the network behavior to ensure that all known network devices are operating as configured and intended. During the "monitoring" stage 308, the IoT and OT security device 150 may monitor the network, via its passive approach, for traffic that may be suspicious. For example, the device 150 may listen for certain devices communicating at atypical times of the day, at a higher frequency than usual, or having communications with atypical characteristics. When the IoT and OT security device 150 identifies suspicious network traffic originating from a particular device, it transitions into the "detection" stage 310 to determine whether the particular device poses a potential threat to the network. During the "detection" stage 310 the security device 150 may immediately send one or more focused probes to the device to further assess the device's state and the types of potential security threats or vulnerabilities relating to the device. After "detecting" one or more potential threats or vulnerabilities, the IoT and OT security device 150 may perform the "response" stage 312 to mitigate these security threats by making changes or updates to the device to improve the device's or network's security or eliminate a detected vulnerability. For example, based on the nature of the detected threat or vulnerability and the characteristics of the device itself, the security device 150 may isolate the device from the network, change the specific state or configurations of the device, block or restrict communications to and from the device, update the firmware of the device, update the password or other information needed to access the device, etc.

A more specific example of how the IoT and OT security device 150 may perform the monitoring, detection, and response stages 308, 310, and 312 will now be described for a network containing an IoT device, such as a traditional IP camera. During the monitoring stage 308, the security device 150 monitors communications over the network, via its passive approach, and detects, during the detection stage 310, that the IP camera is attempting to establish an outbound secure shell ("SSH") connection with another device on the network. SSH connections typically are used by network administrators to remotely access a computer or other device on a network, and it is extremely uncommon for IoT devices, such as the IP camera, to try to establish such a connection. Therefore, detecting that the IP camera is initiating an SSH connection indicates that someone may be potentially attempting to improperly access devices on the network or perform some other malicious activity. As such, the IoT and OT security device 150 may automatically perform an "investigation" into the IP camera to confirm whether its attempt to establish an outgoing SSH connection is, in fact, a result of nefarious activity. In this case, the security device 150 may verify whether establishing SSH connections is enabled as a remote network service on the IP camera. Furthermore, the security device 150 may send one or more probes to the IP camera to elicit one or more responses identifying the current state of the IP camera and various device characteristics to determine if the camera has been "hacked" or otherwise compromised. If the responses to the probes indicate that the IP camera has been compromised, the IoT and OT security device 150 transitions to the response stage 312 and takes actions to eliminate the security threat. For example, the security device 150 may disable the SSH connection capabilities of the IP camera and change certain configurations or device-specific settings of the camera. Additionally or alternatively, the security device 150 may isolate the IP camera from the network, block or restrict communications to and from the camera, etc. The ability of the security device 150 to not only monitor the network for suspicious communications (per the passive approach), but to also automatically and proactively take steps to investigate suspicious activities and eliminate security threats (per the active approach), enables the security device 150 to protect the network significantly more effectively and efficiently than either the traditional passive approach or the traditional active approach.

While FIG. 3A shows the discovery stage 302 followed by the assessment stage 304, followed by the remediation stage 306, followed by the monitoring stage 308, followed by the detection stage 310, followed by the response stage 312, the hybrid approaches described herein are not only applicable to each of these stages (and other stages), but the stages themselves can also occur in any order or in parallel, depending on the particular application and/or the status of the network. For example, the monitoring stage 308 may occur in the background while a hybrid site manager initiates a new discovery stage 302 when new devices are being added to an otherwise well-established network. Moreover, the stages described herein are illustrative and non-limiting as to where, when, and/or how the hybrid approaches may be applied. For example, those in the field of IoT and OT security may consider the monitoring and detection stages to be distinct stages or a single stage, and embodiments of the hybrid approaches apply equally well to each stage performed independently or as a single stage in the overall IoT and OT security process.

Figure 3B:
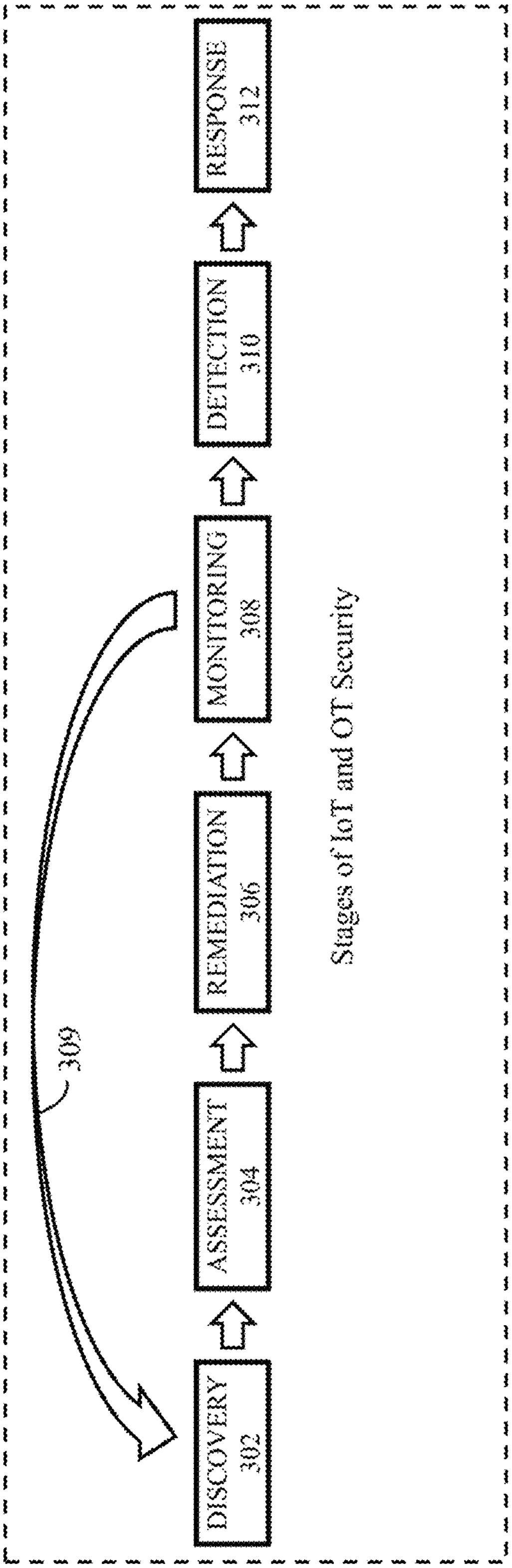
FIG. 3B is a categorization of IoT and OT security into stages where hybrid techniques are utilized, according to some embodiments.

FIG. 3B illustrates an exemplary, non-limiting relationship between the discovery stage 302 and the monitoring stage 308. As shown in this example, the IoT and OT security device 150 sequentially performs the discovery stage 302, the assessment stage 304, the remediation stage 306, the monitoring stage 308, the detection stage 310, and the response stage 312. After the monitoring stage 308, the security device 150 initiates the discovery stage 302 again (as noted by the arrow 309). For example, the security device 150 may need to repeatedly perform the discovery stage 302 for a network when new devices are typically added to (and removed from) the network. Furthermore, the discovery stage 302 may need to be repeatedly performed to discover malicious devices that unpredictably connect to the network. Moreover, embodiments of the process are not limited processing the discovery stage 302 again after the monitoring stage 308. For instance, the discovery stage 302 may be repeated after any one of the assessment, remediation, monitoring, detection, and response stages 304, 306, 308, 310, and 312. Moreover, if the IoT and OT security device 150 is designed to check very frequently for new devices connecting to the network, the discovery stage 302 may be repeated after each one of the assessment, remediation, monitoring, detection, and response stages 304, 306, 308, 310, and 312 or may continuously run in the background simultaneously with the stages 304, 306, 308, 310, and 312. Furthermore, in yet other embodiments, the discovery, assessment, remediation, monitoring, detection, or response stage 302, 304, 306, 308, 310, or 312 may be interrupted if the process determines that performing a higher priority task in another stage is required. For example, if a plurality of network devices are in the process of updating their firmware to a newer version in the response stage 312, actively probing and/or passively monitoring the network may reveal an ongoing potential threat that is more of a threat to the newer firmware version than the older version. In this case, the process may suspend performing the response stage 312 and dedicate more resources to performing the monitoring and detection stages 308 and 310.

Another example in which the IoT and OT security device 150 performs the stages shown in FIG. 3A will be described with reference to the network of the hospital 100 shown in FIGS. 1A-1C. When the new network device 160 is added to the network 100 while the security device 150 is listening to the network 100 (via the passive approach), the security device 150 may perform the discovery stage 302 to identify the new device 160. Namely, when the new device 160 starts communicating over the network 100 and the security device 150 "hears" the communications, the security device 150 may send one or more targeted probes to the new device 160 (via the active approach) to learn more information about its identity and configuration. After the identity and configuration of the new device 160 are known, the security device 150 may perform the assessment stage 304 to determine whether the new device 160 has any vulnerabilities or poses a security threat. For instance, the security device 150 may send one or more targeted probes to the new device 160 to determine the device's firmware version and whether the device is using a default password. Based on the responses to the probes, the security device 150 may conclude that the firmware version of the new device 160 is outdated and that the device 160 is still configured with its default password. As a result, the security device 150 performs the remediation stage 306 to update the firmware and change the password for the new device 160.

After the new device 160 has been "discovered," "assessed," and "remediated" in stages 302, 304, and 306, the network of the hospital 100 is stable, and the IoT and OT security device 150 enters the monitoring stage 308 to listen for network communications (via the passive approach) that may be indicative of a security threat or nefarious activity. During the monitoring stage 308, the security device 150 may "hear" messages being sent from the MRI device 130 over the network at a frequency that is significantly higher than usual, which in turn, causes the security device 150 to detect a potential security issue in the detection stage 310. Accordingly, the security device 150 automatically performs an "investigation" into the MRI device 130 to confirm whether its frequent transmission of messages is, in fact, a result of a security breach. In this case, the security device 150 may send one or more probes to the MRI device 130 (via the active approach) to elicit one or more responses identifying the current state of the device 130 and various device characteristics to determine if the device 130 has been compromised. If the responses to the probes indicate that the MRI device 130 has been compromised, the security device 150 transitions to the response stage 312 and takes actions to eliminate the security threat. As in the example described above for the IP camera, the security device 150 may change certain configurations or device-specific settings of the MRI device 130. Additionally or alternatively, the security device 150 may isolate the MRI device 130 from the network, block or restrict communications to and from the device 130, etc.

In another example, relating to the network of the hospital 100, the IoT and OT security device 150 may conduct the monitoring stage 308 on the previously discovered and known workstations 110 and 120, MRI device 130, and diagnostic device 140. Simultaneously, the IoT and OT security device 150 may initiate a new discovery stage 302 when the new network device 160 is added to the network. Other examples can include the discovery stage 302 being performed by a hybrid site manager as part of an initial device enrollment period, and then afterwards, only the assessment stage 304, remediation stage 306, monitoring stage 308, detection stage 310, and response stage 312 utilize the hybrid site manager.

In yet another example, with reference to FIGS. 1A-1C, the IoT and OT security device 150 may be updating firmware on the MRI device 130 or installing software patches on the workstations 110 and 120 in a response stage 312. At the same time, the IoT and OT security device 150 may determine, by passively and/or actively monitoring the network during the monitoring stage 308, that a new network device 160 poses a security threat. In this case, the IoT and OT security device 150 can pause the firmware updates and/or software patch installations being performed in the response stage 312 and dedicate additional resources to executing the monitoring and detection stages 308 and 310 to determine additional information about the new network device 160 and to locate and identify the risks posed by the device 160 if it is malicious.

Figure 4:
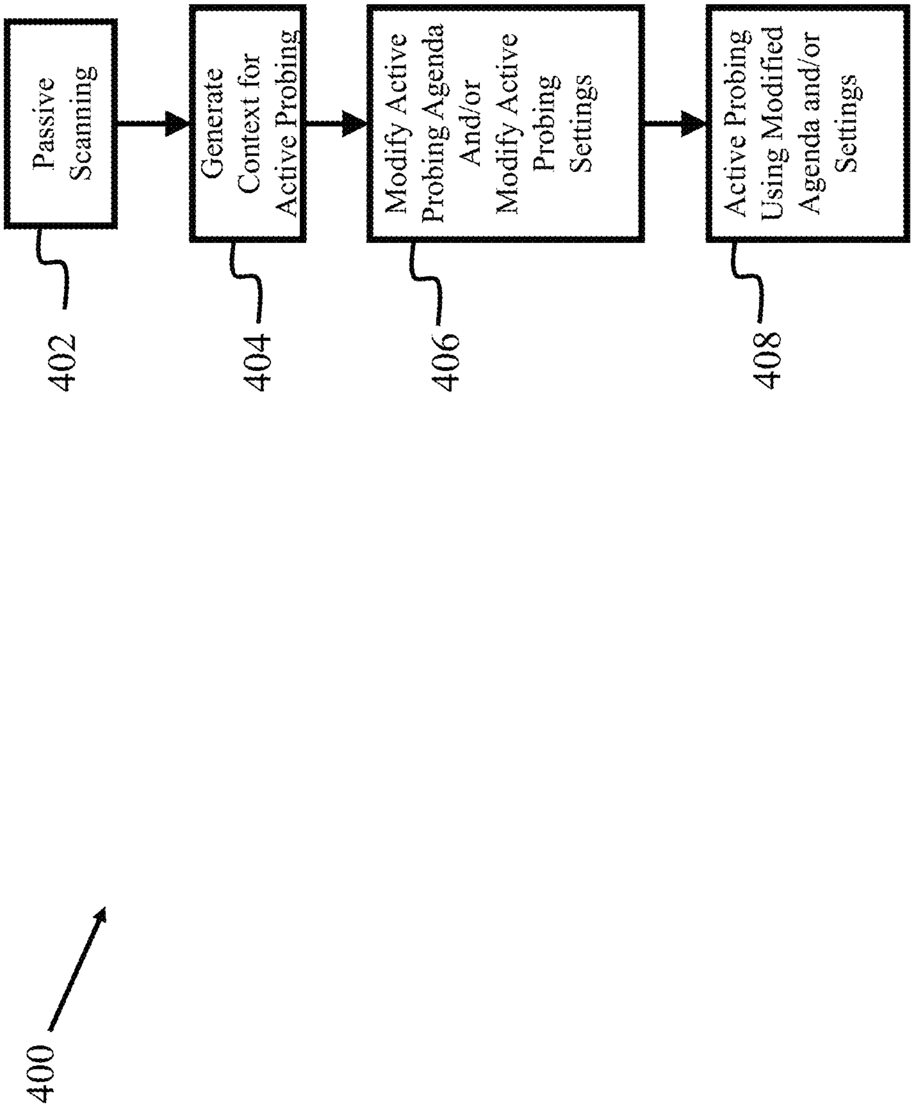
FIG. 4 is a passive context generation process, according to some embodiments.

As explained above, a hybrid site manager can modify or tailor its active approach for evaluating IoT and OT security based on information received or gleaned from performing a passive approach for evaluating the network. A non-limiting example of a process for tailoring an active approach based on the results of a passive approach is illustrated in FIG. 4. As shown, the process 400 includes a passive scanning step 402, a passive context generation step 404, an active probing agenda modification step 406, and an active probing step 408.

The passive scanning step 402 monitors traffic exchanged between devices on the network and evaluates the traffic to discover devices and determine whether any of the network devices potentially poses a security threat. In some embodiments, the hybrid site manager may first perform this step when it is initially deployed on the network. In other embodiments, the passive scanning step 402 may be initiated after the manager is deployed and after all known network devices are connected to the network. Of course, the passive scanning step 402 (as well as the entire process 400) may be repeated periodically to continuously discover devices connected or being connected to the network and detect for malicious devices and security threats.

After the passive scanning step 402, the hybrid site manager performs the passive context generation step 404. In this step, the hybrid site manager evaluates information about the traffic that it passively monitored in step 402 and determines how the information can be used to better tailor the interrogation probes that will subsequently be transmitted over the network during the active probing step 408. For example, if the hybrid site manager detects traffic having an unfamiliar communication protocol that is not typically transmitted from legitimate devices on the network, the manager may keep track of this information as "context" information to determine which probes to transmit over the network or how to modify the probes to be transmitted.

After the passive context generation step 404, the hybrid site manager performs the modification step 406. In the modification step 406, the hybrid site manager uses the context information obtained in step 404 to add or modify the interrogating probes or tiers of probes that will be sent over the network. Continuing with the example above, after the hybrid site manager receives the message with the unfamiliar communication protocol, it may use the corresponding "context" information to add a probe or tiers of probes that send messages with this protocol in order to try to further identify any unknown network devices sending messages with this protocol and/or assess whether they are malicious.

In some embodiments, the hybrid site manager may add or modify the probes by modifying a discovery agenda as described above. Again, continuing with the example above, the existing discovery agenda may be modified to add probes that send messages in accordance with the unfamiliar protocol to try to learn more about the unknown devices that are transmitting messages with this protocol and/or assessing their threat. As another example, in light of the context information generated in step 404, after sending a first tier of probes in a discovery agenda, a subsequent tier may be entirely skipped in response to the context information indicating a network attack is currently posing a higher priority threat. In this case, the existing discovery agenda may be modified so that the network can address the higher priority threat. As yet another example, the hybrid site manager may refrain from sending a tier of probes to certain ports or a tier of probes having a particular protocol for a certain period of time if the context information indicates that network traffic has not been sent from those ports or has not included messages with the particular protocol for an extended period of time. By doing so, the hybrid site manager can conserve network bandwidth and reallocate resources to focus on more higher probability security risks.

In other embodiments, the modification step 406 includes keeping a preset discovery agenda intact, and instead changing settings of the agenda. In one example, the frequency at which interrogating probes are sent over the network may be increased or decreased.

After modifying the probes in step 406, the hybrid site manager sends the modified probes over the network in the active probing step 408, per the intelligent active approach discussed above.

Figure 5:
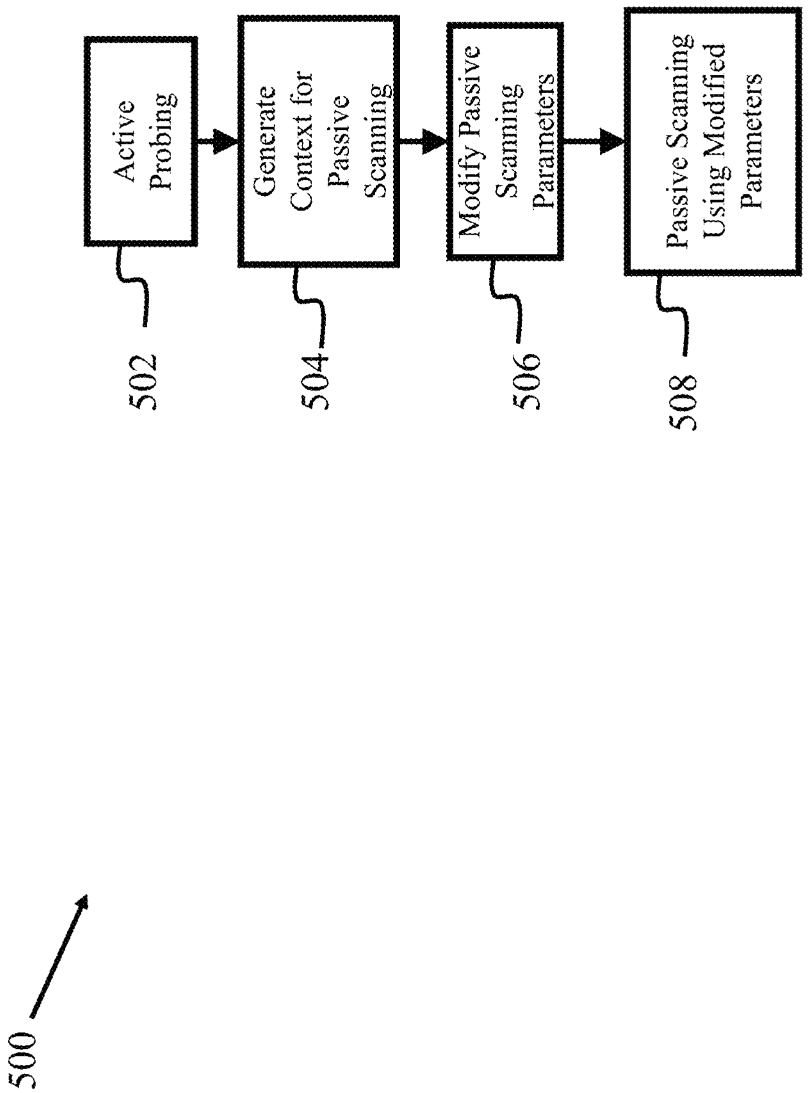
FIG. 5 is an active context generation process, according to some embodiments.

As explained previously, in addition to modifying its active approach based on information learned from its passive approach, the hybrid site manager can also modify its passive approach based on information learned from its active approach. A non-limiting example of a process for tailoring a passive approach based on the results of an active approach is shown in FIG. 5. As shown, the process 500 includes an active probing step 502, an active context generation step 504, a parameter modification step 506, and a passive scanning step 508.

The active probing step 502 includes, in at least one example, actively probing a network, using a discovery agenda, by sending interrogating probes to devices on the network and receiving corresponding responses, per the active approach discussed above. In some embodiments, the hybrid site manager may first perform this step when it is initially deployed on the network. In other embodiments, the active probing step 502 may be initiated after the manager is deployed and after all known network devices are connected to the network. Of course, the active probing step 502 (as well as the entire process 500) may be repeated periodically to continuously discover devices connected or being connected to the network and detect for malicious devices and security threats.

After the active probing step 502, the hybrid site manager performs an active context generation step 504. In this step, the hybrid site manager evaluates information in the responses to the probes that it receives from the devices on the network and determines how the information can be used to better tailor the manner in which it will passively scan for traffic on the network during the passive scanning step 508. For example, if a response to a probe indicates that a potentially malicious device on the network has a certain version of firmware and communicates in accordance with a particular communication protocol, the hybrid site manager may keep track of this information as "context" information to determine how to alter its passive scanning operation.

After the active context generation step 504, the hybrid site manager performs the modification step 506. In the modification step 506, the hybrid site manager uses the context information obtained in step 504 to modify the manner in which it passively monitors the traffic on the network. Continuing with the example above, after the hybrid site manager receives the response to the probe indicating that a potentially malicious device communicates in accordance with a particular protocol, it may use this corresponding "context" information to modify its passive scanning operation, or parameters used by its scanning operation, so that the scanning operation "listens" for messages having the protocol. By modifying its passive approach in this manner, the hybrid site manager can reallocate its resources to listen for messages having protocols that are more likely to be sent from the potentially malicious device.

In some embodiments, the modification step 506 includes modifying how often passive scanning occurs (e.g., once every few minutes, once per hour, once per day, once per week, once per month) and/or what type of data is to be detected from the passive scanning (e.g., data from a particular port number).

After modifying its passive approach in step 506, the hybrid site manager performs the passive scanning to monitor traffic transmitted on the network in the passive scanning step 508.

Additional Examples of Hybrid Approaches Applied to IoT and OT Security

Non-limiting examples of the hybrid techniques disclosed herein have been described in the context of specific networks, such as the network of the hospital 100 in FIGS. 1A-1C, and in connection with the various stages of IoT and OT security that can be performed on a network, as shown in FIGS. 3A-3B. The hybrid approaches disclosed herein can also be applied to other scenarios or network configurations that may be encountered in the IoT and OT security context, as well as other contexts.

In one embodiment, a hybrid site manager (e.g., the hybrid site manager 105 (FIG. 2) or the IoT and OT security device 150 ((FIGS. 1A-1C) configured as a hybrid site manager) may listen to traffic over a network during a discovery stage 302 (FIGS. 3A-3B) (via the passive approach) to discover a new device (e.g., unknown device 205 (FIG. 2) or new network device 160 (FIGS. 1A-1C)) on the network. After discovering the new device, the hybrid site manager may determine whether the new device is vulnerable to a security breach during the assessment stage 304. For example, as explained above, the hybrid site manager may send probes to the new device (via the active approach) to learn more information about the device, such as the firmware version of the device or whether the device is using a default password to access the device or network. If the responses to the probes indicate that the new device's firmware is outdated and that the new device is using a default password, the hybrid site manager may address the potential security risk during the remediation stage 306. For example, the hybrid site manager may send probes or other instructions to the new device to update the device's firmware and change its password.

In addition, after the security risks of the new device (as well as the security risks of other devices on the network) have been remediated, the hybrid site manager may listen to traffic transmitted over the network during the monitoring stage 308 (via the passive approach) to determine whether any of the traffic is indicative of a malicious attack or a security breach during the detection stage 310. For example, as explained above, if certain devices are transmitting messages at unusual times during the day, transmitting an unusually large number of messages, and/or transmitting certain types of messages that the devices do not usually transmit, the hybrid site manager may send one or more focused probes to those devices (via the active approach) to further assess the potential security breach. If the responses to the probes (or lack of responses to the probes) indicate that the devices are being used for, or subjected to, a malicious attack, the hybrid site manager may mitigate or eliminate the security breach during the response stage 312.

According to some embodiments, during the response stage 312, the hybrid site manager may perform one or more of the following actions: (1) blocking communication channels via which the devices are connected to the network, (2) blocking or restricting communications to and from the devices, (3) modifying or updating the firmware of the new devices, (4) modifying configuration parameters of the new devices, and/or (5) modifying policies of the new devices. A configuration parameter may include, in at least one example, a default password that has not yet been changed to a more secure password. A policy may include, in at least one example, disabling the new device's ability to send unencrypted information or provide an unencrypted service. Of course, in light of the teachings of the present disclosure, one skilled in the art would understand that the hybrid site manager may perform other actions to address the security breach or malicious attack.

In the example above, discovering a new device, assessing its vulnerabilities, and remediating its vulnerabilities during the stages 302, 304, and 306 are achieved, in one implementation, via the passive context generation process 400 (FIG. 4) and/or the active context generation process 500 (FIG. 5). Similarly, monitoring the network for a security breach, detecting the security breach, and responding to the security breach during the stages 308, 310, and 312 are also achieved, in one implementation, via the passive context generation process 400 (FIG. 4) and/or the active context generation process 500 (FIG. 5).

In some embodiments, during the discovery and assessment stages 302 and 304, the hybrid site manager may identify an unknown device on the network by passively acquiring information from another device on the network (e.g., by listening to communications sent and received by the other device) indicating that a particular communication protocol is being used in communications with the unknown device. After initially identifying the unknown device during this passive approach, the hybrid manager may employ its active approach and transmit a targeted message (such as an interrogation probe described above) to the unknown device using the particular communication protocol to acquire additional information about the unknown device and further identify it and/or assess whether it is vulnerable to a malicious attack.

Similarly, in some embodiments, during the monitoring and detection stages 308 and 310, the hybrid site manager may detect a potential malicious attack or security threat on the network by passively acquiring information from a device on the network (e.g., by listening to communications sent and received by the device) indicating that the device is acting in an unusual manner. After detecting the potential threat during this passive approach, the hybrid manager may employ its active approach and transmit a targeted message (such as an interrogation probe described above) to the suspicious device to acquire additional information about the device and further detect whether it is malicious.

In some embodiments, as described above, after the discovery and assessment stages 302 and 304, the hybrid site manager can be configured to proactively remediate a device's vulnerabilities on the network by performing the remediation stage 306. For example, if the hybrid site manager determines that credentials of a network device need to be updated in the assessment stage 304 (e.g., a default password that has never been changed), it can proactively remediate the situation during the remediation stage 306 by retrieving the current credentials for the device and updating them accordingly. Similarly, if the hybrid site manager determines that a device's firmware, software, or drivers pose a security risk and need to be updated, it can proactively update the firmware, software, or drivers. After remediating the device in the remediation stage 306, the hybrid site manager monitors the device (as well as other devices on the network) during the monitoring stage 306 to keep track of the status of the password, firmware, software, or drivers to ensure they do not unexpectedly change (a process sometimes called "drift monitoring").

In some embodiments, the passive context information generated during step 404 of the process 400 (FIG. 4) may include information about a specific type of device such as: a communication protocol used by the device to transmit data, intermittent timings of packets transmitted by the device over the network, a type of packet transmitted by the device over the network, and a time of day that the device transmits data over the network.

In some embodiments, based on the passive context information generated during step 404 of the process 400, in step 406, the hybrid site manager may modify the scope of a discovery agenda setting forth criteria of interrogating probes to be transmitted over the network via the active approach in step 408. For example, based on the context information, the manager may narrow an existing discovery agenda by reducing the number of probes to be transmitted over the network. In another example, the hybrid site manager may broaden an existing discovery agenda by increasing the number of probes to be transmitted over the network. The discovery agendas can be, for example, static or hard coded and/or can be calibrated or modified.

In some embodiments, the active context information generated during step 504 of the process 500 (FIG. 5) may include information about a specific type of device such as: a version and status of firmware installed on the device, a communication protocol used by the device to transmit data, intermittent timings of packets transmitted by the device over the network, a type of packet transmitted by the device over the network, and a time of day that the device transmits data over the network.

In some embodiments, based on the active context information generated during step 504 of the process 500, in step 506, the hybrid site manager may modify the parameters used to conduct passive scanning of the network via the passive approach in step 508. For example, based on the context information, the manager may conduct passive scanning at a different frequency of time (e.g., changing from once per day to once per week). In another example, the manager may modify the type of data that is to be detected from the passive scanning (e.g., data from a particular port number or data having a particular protocol).

In some embodiments, during the discovery, assessment, monitoring, and/or detection stages 302, 304, 308, and 310, the hybrid site manager can observe communications from a High-Definition Multimedia Interface (HDMI) port to a Programmable Logic Controller (PLC) (e.g., the PLC 219 (FIG. 2)) over a network. In one example, the hybrid site manager may observe this communication during the passive scanning step 402 (FIG. 4), and the information gleaned from the passive scanning may be included as context information during the active context generation step 404. After generating the context information, the hybrid site manager may send interrogation probes, per its active approach, to communicate with the PLC 219 and confirm whether the communications received from the HDMI port was intended, desired, or appropriate.

In some embodiments, after the hybrid site manager actively probes the network (e.g., in the active probing step 502 (FIG. 5)), it may generate active context information (e.g., in the active context generation step 504). Based on this context information, the hybrid site manager may modify passive scanning parameters (e.g., in the parameter modification step 506). For example, modifying the passive scanning parameters may include changing the parameters so that the hybrid site manager passively listens for communications from one type of port (e.g., an HDMI port) to another type of device (e.g., a PLC port). In other examples, passively listening can be performed in the discovery stage 302 and/or monitoring stage 308.

In some embodiments, during the remediation and response stages 306 and 312 (FIGS. 3A-3B), in order to address a vulnerability or security threat, the hybrid site manager can prevent a Domain Name Server (DNS) from resolving a DNS query from a potentially malicious device and returning an IP address for a legitimate network device to the potentially malicious device.

In some embodiments, during the discovery stage 302 (FIGS. 3A-3B), the hybrid site manager can classify one or more devices on a network by the devices' make, model, and/or serial number of the device. Moreover, the manager can compare this classification with an existing list of classifications of the types of devices that would typically connect to the network.

In some embodiments, the passive monitoring capabilities of the hybrid techniques described herein (e.g., during the discovery and monitoring stages 302 and 308 (FIGS. 3A-3B)) can apply to various sources of traffic, including but not limited to unicast, broadcast, multicast, control, logs from firewalls, switches, DNS queries and resolutions, Dynamic Host Configuration Protocol (DHCP) sources, and copies of traffic for Deep Packet Inspection (DPI).

In addition to detecting and responding to security threats to, and vulnerabilities of, a network, the hybrid approach can be used for "predictive maintenance" of devices connected to a network. As a non-limiting example, some networks may include an industrial printer. If the printer is compromised, not only during a security breach or malicious attack, but also as a result of an operational failure due to ordinary wear and tear during the printer's lifecycle, all "downstream" activities from the processes performed by the printer may be crippled. These downstream activities may include downstream activities at the manufacturing site where the printer is located, the distribution of products (which rely on the printer's processes) from the manufacturing site, and the ultimate delivery of the products to retail stores. By using the hybrid approach, the hybrid site manager can detect organic operational wear of the printer and address any issues before the wear causes the printer to catastrophically fail or makes it more vulnerable to a malicious attack. For example, the hybrid site manager may (via the passive approach) monitor status messages of the printer, messages relating to the quality and quantity of the output of the printer, etc. to determine if any organic operational wear of the printer is degrading its performance or may cause a failure. If the hybrid site manager detects a significant amount of operational wear, it can send probes or other messages to the printer and/or over the network (via the active approach) to remedy the situation. For example, if the degraded operation of the printer can be addressed by updating the printer's firmware, drivers, or configuration, the hybrid manager can send probes or messages to perform such updates. Alternatively or additionally, the hybrid site manager can send probes or messages to have the network use an alternative or backup printer instead of the failing printer and/or can alert an operator at the manufacturing site about the issues with the printer.

Figure 6:
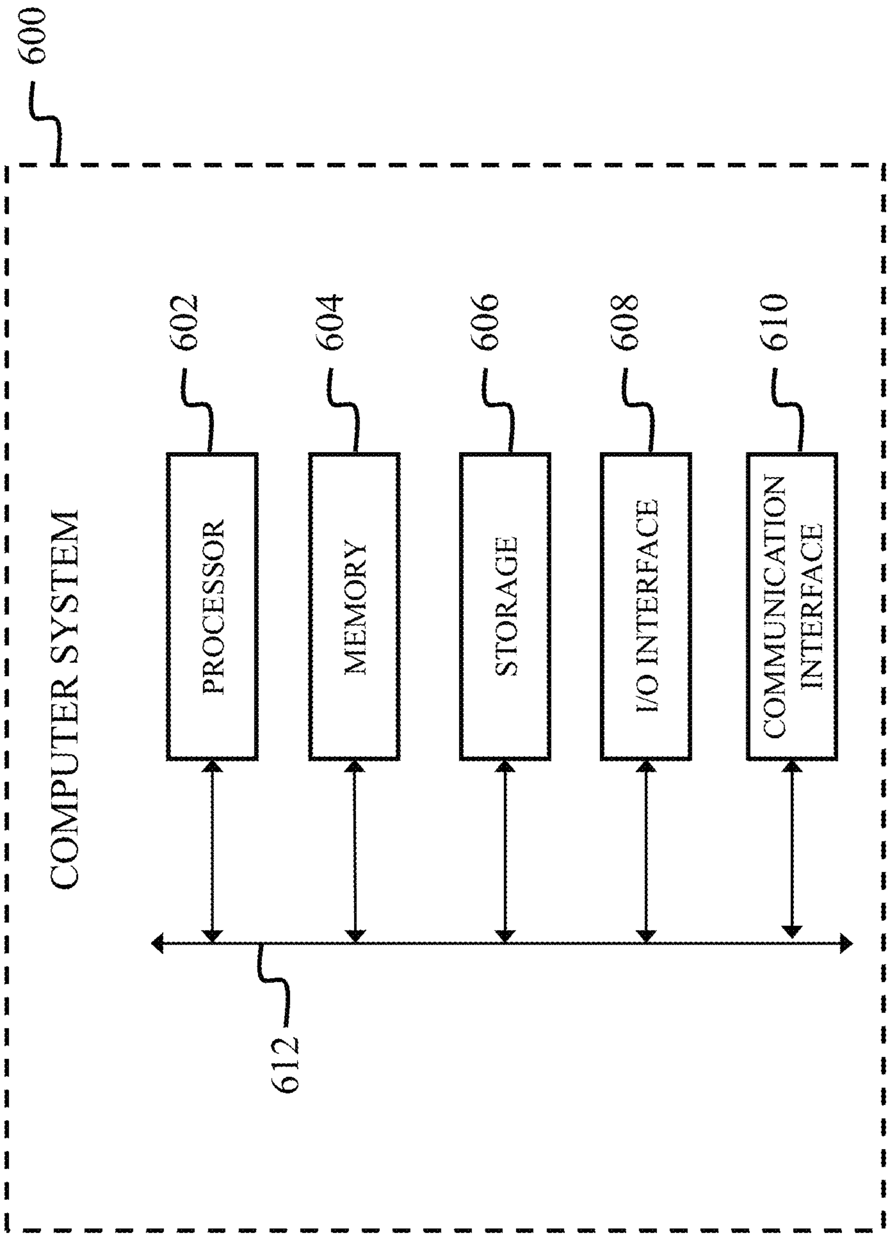
FIG. 6 is an example computer system, according to some embodiments.

FIG. 6 illustrates an example of a computer system 600. In some embodiments, one or more computer systems 600 perform one or more steps of one or more methods described or illustrated herein. In some embodiments, one or more computer systems 600 provide functionality described or illustrated herein. In some embodiments, software running on one or more computer systems 600 performs one or more steps of one or more methods described or illustrated herein or provides functionality described or illustrated herein. Some embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In some embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In some embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In some embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In some embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In some embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In some embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In some embodiments, one or more memory management units (MMU s) reside between processor 602 and memory 604 and facilitate accesses to memory 604 requested by processor 602. In some embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In some embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In some embodiments, storage 606 is non-volatile, solid-state memory. In some embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In some embodiments, the passive context generation process 400 and/or active context generation process 500 are implemented as software instructions stored in the storage 606 and executed by the processor 602. The computer system 600 is, in at least one embodiment, a single hardware device that includes a hybrid site manager (e.g., the hybrid site manager 105).

The hybrid site manager may, in certain examples, be deployed on a remote server or otherwise at a remote site that includes the computer system 600, where the computer system is in communication with a separate server that executes a software platform including a GUI for a user to assess a local network of the computer system 600. In an example, the GUI includes user-selectable graphical elements (e.g., a radio button, a drop-down menu) that select various commands, parameters, and/or data. Depending on the particular mode selected, the software platform embodying the GUI initiates communication with a remotely located hybrid site manager to perform the passive context generation process 400 and/or the active context generation process 500 as part of any of the discovery stage 302, the assessment stage 304, the monitoring stage 306, the detection stage 308, and the response stage 310.

In some embodiments, a hybrid site manager (e.g., the hybrid site manager 105) and the software platform embodying the GUI are deployed at the same location. For example, a user may have several networks in a particular environment. In one example, the user has a protected internal network where the hybrid site manager is deployed and another internal network that is in communication with the hybrid site manager. In one example, a warehouse includes many embedded devices (e.g., cameras, sensors, smart switches, thermostats), and an office in the same environment includes a plurality of printers and desktop computers. In this example, a user may deploy the hybrid site manager on a server that is connected to all of the warehouse devices while the software platform embodying the GUI is deployed on a computer system (e.g., a computer system 600) connected to a separate network in the office (e.g., via the communication interface 610) where IoT and OT security operations may be initiated.

In some embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In some embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI or cellular network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In some embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

It is to be understood that the disclosed subject matter is not limited in its application to the details of construction and to the arrangements of the components set forth in the previous description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow an equivalents thereof.

The invention claimed is:

1. A method of assessing a network, comprising:

transmitting, by a site manager executing on a computer, a first probe over the network to a first network device;

receiving, over the network, a first response to the first probe;

determining active information about the first network device based on the first response; and performing passive scanning on the network, wherein the passive scanning is modified based on the active information.

2. The method of claim 1, wherein the active information comprises a configuration of the first network device.

3. The method of claim 1, wherein the active information comprises a type of the first network device.

4. The method of claim 1, wherein the active information comprises a firmware version of the first network device.

5. The method of claim 1, further comprising:

determining, by transmitting the first probe on the network, a status of the first network device.

6. The method of claim 1, further comprising:

responding to, by transmitting a second probe on the network, a risk identified about the first network device based on the passive scanning.

7. The method of claim 1, further comprising:

responding to, by transmitting a second probe on the network, a risk identified about the first network device based on the active information.

8. The method of claim 1, further comprising:

monitoring, based on the passive scanning, a status of the first network device.

9. The method of claim 1, further comprising:

obtaining passive information comprising a first network device characteristic of the first network device based on the passive scanning.

10. The method of claim 9, further comprising:

transmitting, over the network, a second probe configured based on the passive information.

11. The method of claim 1, wherein the site manager is configured by a discovery agenda.

12. The method of claim 1, wherein the passive scanning is performed during at least one of a discovery stage and a monitoring stage.

13. The method of claim 12, wherein, during the discovery stage, the site manager discovers that the first network device is connected to the network, and wherein, during the monitoring stage, the site manager monitors the first network device for a security threat.

14. The method of claim 1, wherein the first probe is sent during at least one of an assessment stage, a remediation stage, a detection stage, and a response stage.

15. The method of claim 14, wherein the assessment stage obtains additional information about the first network device based on a response to the first probe, wherein the remediation stage uses the first probe to modify an aspect of the first network device to reduce a vulnerability of the first network device, wherein the detection stage detects a security threat relating to the first network device at least partially based on a response to the first probe, and wherein the response stage uses the first probe to modify at least one of an aspect of the first network device and an aspect of the network to address the security threat.

16. A system for assessing a network comprising:

one or more processors and one or more memories coupled to the one or more processors, the one or more memories comprising instructions executable by the one or more processors, and the one or more processors being operable when executing the instructions to:

transmit a first probe over the network to a first network device;

receive, over the network, a first response to the first probe;

determine active information about the first network device based on the first response;

perform passive scanning on the network, wherein the passive scanning is modified based on the active information.

17. The system of claim 16, wherein the active information comprises a configuration of the first network device.

18. The system of claim 16, wherein the active information comprises a type of the first network device.

19. The system of claim 16, wherein the active information comprises a firmware version of the first network device.

20. The system of claim 16, wherein the one or more processors are further operable when executing the instructions to:

determine, by transmitting the first probe on the network, a status of the first network device.

21. The system of claim 16, wherein the one or more processors are further operable when executing the instructions to:

respond to, by transmitting a second probe on the network, a risk identified about the first network device based on the passive scanning.

22. The system of claim 16, further comprising:

respond to, by transmitting a second probe on the network, a risk identified about the first network device based on the active information.

23. The system of claim 16, wherein the one or more processors are further operable when executing the instructions to:

monitor, based on the passive scanning, a status of the first network device.

24. The system of claim 16, wherein the one or more processors are further operable when executing the instructions to:

obtain passive information comprising a first network device characteristic of the first network device based on the passive scanning.

25. The system of claim 24, wherein the one or more processors are further operable when executing the instructions to:

transmit, over the network, a second probe configured based on the passive information.

26. The system of claim 16, wherein the site manager is configured by a discovery agenda.

27. The system of claim 16, wherein the passive scanning is performed during at least one of a discovery stage and a monitoring stage.

28. The system of claim 27, wherein, during the discovery stage, the site manager discovers that the first network device is connected to the network, and wherein, during the monitoring stage, the site manager monitors the first network device for a security threat.

29. The system of claim 16, wherein the first probe is sent during at least one of an assessment stage, a remediation stage, a detection stage, and a response stage.

30. The system of claim 29, wherein the assessment stage obtains additional information about the first network device based on a response to the first probe, wherein the remediation stage uses the first probe to modify an aspect of the first network device to reduce a vulnerability of the first network device, wherein the detection stage detects a security threat relating to the first network device at least partially based on a response to the first probe, and wherein the response stage uses the first probe to modify at least one of an aspect of the first network device and an aspect of the network to address the security threat.

* * * * *